United States Patent
Viorel et al.

(10) Patent No.: US 10,334,630 B2
(45) Date of Patent: Jun. 25, 2019

(54) SYSTEM AND METHOD FOR USER-OVER-CONTROL PLANE MESSAGING IN A WIRELESS NETWORK

(71) Applicant: FUJITSU CONNECTED TECHNOLOGIES LIMITED, Kawasaki-Shi, Kanagawa (JP)

(72) Inventors: Dorin Gheorghe Viorel, Calgary (CA); Akira Ito, San Jose, CA (US); Paul Bucknell, Brighton (GB); Chenxi Zhu, Fairfax, VA (US)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 930 days.

(21) Appl. No.: 13/710,137

(22) Filed: Dec. 10, 2012

(65) Prior Publication Data

US 2014/0161049 A1 Jun. 12, 2014

(51) Int. Cl.
*H04W 74/08* (2009.01)
*H04W 4/70* (2018.01)

(52) U.S. Cl.
CPC .......... *H04W 74/0833* (2013.01); *H04W 4/70* (2018.02)

(58) Field of Classification Search
CPC .................. H04W 4/005; H04W 74/0833
See application file for complete search history.

(56) References Cited

U.S. PATENT DOCUMENTS

| 2008/0225785 | A1* | 9/2008 | Wang et al. .................. 370/329 |
| 2009/0180443 | A1* | 7/2009 | Kawasaki et al. ............ 370/331 |
| 2009/0203377 | A1* | 8/2009 | Kawasaki ............... H04L 5/005 |
| | | | 455/435.1 |

(Continued)

FOREIGN PATENT DOCUMENTS

| CN | 101217793 | 7/2008 |
| CN | 102265539 | 11/2011 |

(Continued)

OTHER PUBLICATIONS

International Search Report and Written Opinion; PCT/US2013/073824; pp. 14, dated Feb. 19, 2014.

(Continued)

*Primary Examiner* — Andrew Lai
*Assistant Examiner* — M Mostazir Rahman
(74) *Attorney, Agent, or Firm* — Baker Botts L.L.P.

(57) ABSTRACT

A method is provided for managing a wireless network traffic by comprising designating a first resource block of a first base station for access by a random access channel (RACH). The method additionally comprises designating a first plurality of random access subframes associated with the first resource block for access by a user-over-control plane message, and receiving a random access signal at the first base station over a subframe from an endpoint. The random access signal is received on the RACH using a wireless network and is attempting to access one of the first plurality of designated random access subframes. Further, the method comprises determining if the random access (Continued)

signal is a user-over-control plane message, and processing the random access signal on the one of the first plurality of designated random access subframes.

17 Claims, 9 Drawing Sheets

(56) References Cited

U.S. PATENT DOCUMENTS

| | | | | |
|---|---|---|---|---|
| 2010/0195607 | A1* | 8/2010 | Lee | H04W 74/0866 370/329 |
| 2010/0222068 | A1* | 9/2010 | Gaal et al. | 455/450 |
| 2012/0014251 | A1* | 1/2012 | Arnott | H04L 5/0007 370/232 |
| 2012/0165034 | A1 | 6/2012 | Boudreau et al. | |
| 2013/0021997 | A1* | 1/2013 | Lee | H04W 74/0841 370/329 |
| 2013/0039195 | A1* | 2/2013 | Weng et al. | 370/252 |
| 2013/0083749 | A1* | 4/2013 | Xu | H04W 74/0833 370/329 |

FOREIGN PATENT DOCUMENTS

| | | |
|---|---|---|
| CN | 102387599 | 3/2012 |
| WO | WO 2012/104629 | 8/2012 |
| WO | 2012/155234 | 11/2012 |
| WO | WO 2012/155234 | 11/2012 |

OTHER PUBLICATIONS

Lien et al.; "Toward Ubiquitous Massive Accesses in 3GPP Machine-to-Machine Communications"; IEEE Communications Magazine; pp. 14, dated 2011.

Korean Office Action, Application No. 10-2015-7006314, with translation; 9 pages, dated Apr. 25, 2016.

Japanese Office Action, Application No. 2015-545905, with translation; 7 pages, dated Aug. 30, 2016.

Office Action received for Chinese Patent Application No. 201380049614.2, dated Oct. 30, 2017; 13 pages, dated Oct. 30, 2017.

Extended European Search Report received from European Patent Application No. 13814704.6, dated Nov. 10, 2016; 5 pages, dated Nov. 10, 2016.

* cited by examiner

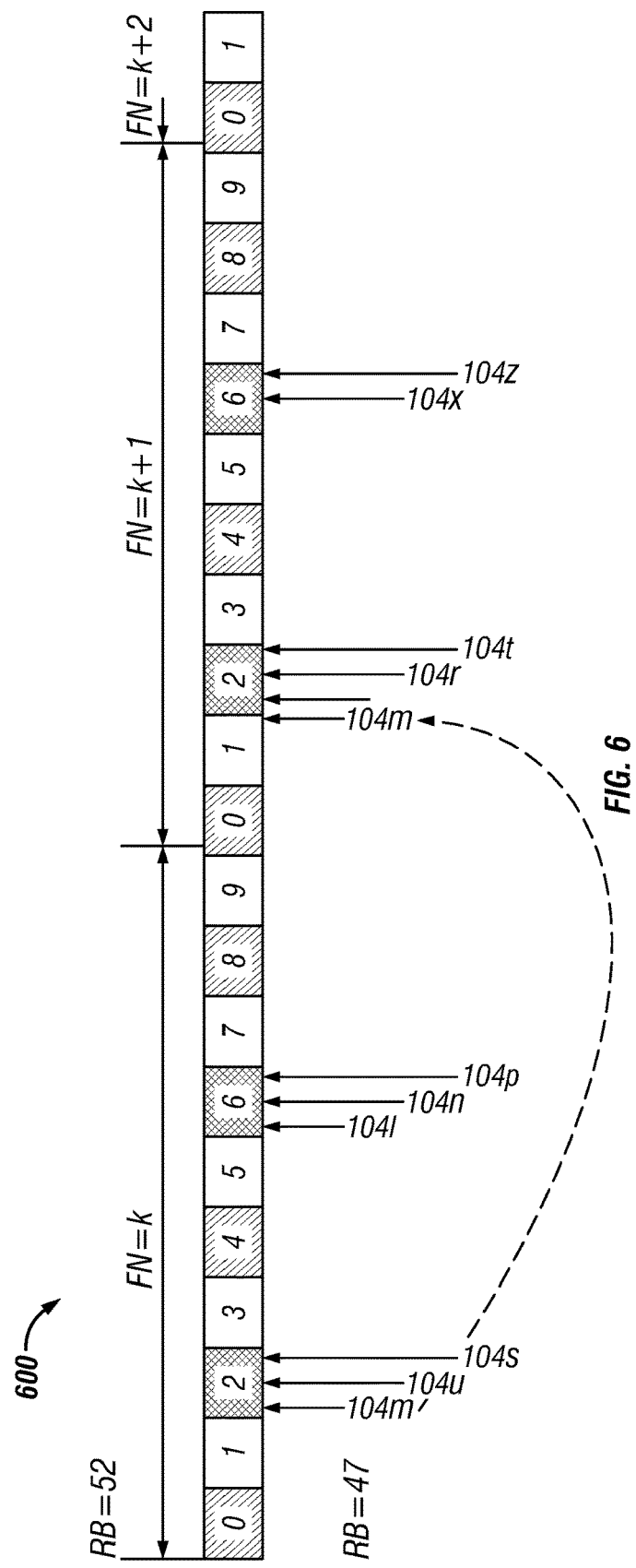

SYSTEM AND METHOD FOR USER-OVER-CONTROL PLANE MESSAGING IN A WIRELESS NETWORK

TECHNICAL FIELD

The present disclosure relates generally to wireless networks, and specifically to systems and methods for user-over-control plane messaging in a wireless network.

BACKGROUND

Various wireless technologies (e.g., 3G, 4G, 3GPP Long Term Evolution (LTE), LTE-Advanced (LTE-A), Worldwide Interoperability for Microwave Access (WiMAX), etc.) allow for the use of small, base stations, generally referred to herein as small cells (e.g., femto base stations or pico base stations in WiMAX or Home Node-B (HeNB), pico base stations or generically designated as small cell base stations in 3GPP LTE specifications). The user or a wireless service provider's technician installs the small cell in the user's home or office to improve the user experience of the local wireless coverage. The small cell's backhaul connection to the wireless service provider's network is provided via the user's network access (e.g., digital subscriber line (DSL)). The small cell operates in a similar wireless fashion (e.g., uses the same air interface protocol) to the wireless service provider's other base stations (e.g., macro base stations (mBSs) and/or relay stations). The small cell may allow for the handover from the mBS to the small cell to be accomplished without the user noticing (e.g., similar to the handover from one mBS to another). Small cells may be useful in machine to machine (M2M) communications that are engineered to communicate with little or no human support by offloading the main cell's traffic. M2M communications in large industrial or machine residential networks may require the connection of over 30,000 machine User Equipment (UE) devices per mBS. Small cells may be able to assist in handling excess data traffic, including M2M traffic, apart from the wireless service provider's macro base stations, thus increasing the overall cell throughput and improving the user experience.

Small cells are expected to enable significant increases in the overall throughput of a macro-cell and thus possibly increasing the overall spectrum efficiency of the respective macro-cell. Small cells may also be able to assist in handling excess data traffic, including M2M traffic, apart from the wireless service provider's base stations, thus lessening the load on the base station and improving performance for the user.

SUMMARY

In accordance with one or more embodiments of the present disclosure, a method is provided for managing a wireless network traffic comprising designating a first resource block of a first base station for access by a random access channel (RACH). The method additionally comprises designating a first plurality of random access subframes associated with the first resource block for access by a user-over-control plane message, and receiving a random access signal at the first base station over a random access subframe from an endpoint. The random access signal is received on the RACH using the wireless network and is attempting to access one of the first plurality of designated random access subframes. Further, the method comprises determining if the random access signal is a user-over-control plane message, and processing the random access signal on the one of the first plurality of designated random access subframes.

In accordance with another embodiment of the present disclosure, one or more non-transitory computer-readable media embodying logic is provided that, when executed by a processor, is configured to perform operations comprising designating a first resource block of a first base station for access by a RACH. The operations additionally comprise designating a first plurality of random access subframes associated with the first resource block for access by a user-over-control plane message, and receiving a random access signal at the first base station over a random access subframe from an endpoint. The random access signal is received on the RACH using a wireless network and is attempting to access one of the first plurality of designated random access subframes. Further, the operations comprise determining if the random access signal is a user-over-control plane message, and processing the random access signal on the one of the first plurality of designated random access subframes.

In accordance with another embodiment of the present disclosure, a base station system for wireless communication is provided comprising a memory and a processor coupled to the memory. The processor is configured to designate a first resource block of a first base station for access by a RACH, and designate a first plurality of random access subframes associated with the first resource block for access by a user-over-control plane message. The processor is further configured to receive a random access signal at the first base station over a random access subframe from an endpoint. The random access signal is received on the RACH using a wireless network, and is attempting to access one of the first plurality of designated random access subframes. The processor is additionally configured to determine if the random access signal is a user-over-control plane message, and process the random access signal on the one of the first plurality of designated random access subframes.

The object and advantages of the invention will be realized and attained at least by the features, elements, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

For a more complete understanding of the present disclosure and its features and advantages, reference is now made to the following description, taken in conjunction with the accompanying drawings, in which:

FIG. 6 illustrates a high priority concatenated U/C message transmitted by a particular endpoint accessing resource block, in accordance with one embodiment of the present disclosure;

DETAILED DESCRIPTION

Figure 1:
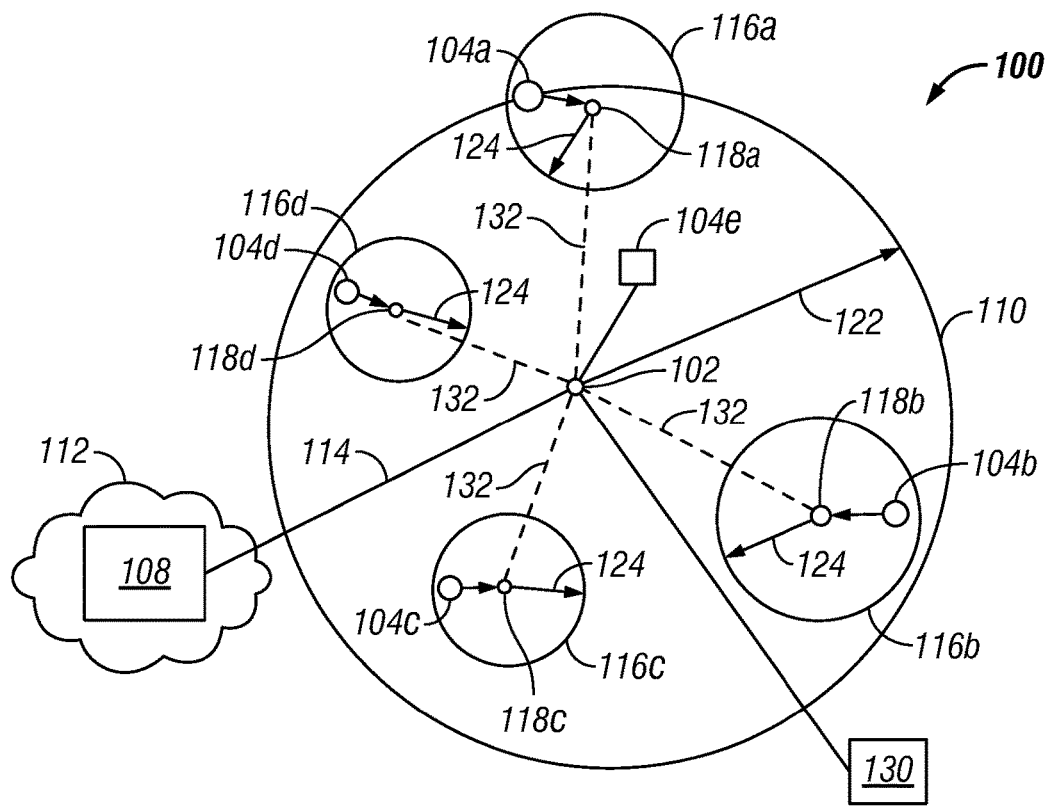
FIG. 1 illustrates an example wireless network using overlaid small cell (OSC) topology, in accordance with one embodiment of the present disclosure.

FIG. 1 illustrates an example wireless network 100 using overlaid small cell (OSCs) topology, in accordance with one embodiment of the present disclosure. Network 100 may include one or more co-located macro base stations (mBS) 102, one or more endpoints 104a-e (collectively referred to as endpoints 104). Network 100 may provide wireless coverage for any suitable number of endpoints 104 over a geographic area such as cell 110. For example, mBS 102 may be used to provide wireless coverage for an entire building, a city block, a campus, or any other contiguous area. Cell 110 may have any suitable coverage shape, such as a circular shape depicted in FIG. 1. Cell 110 may also have any suitable size. For example, cell 110 may have radius 122 of approximately three kilometers.

mBS 102 may be configured to communicate with one or more endpoints 104 using wireless communication via one or more ports (not expressly shown). As used herein, mBS 102 may refer to a transmission site, a remote transmission site, a Radio Element Control, an Evolved Node B (eNB), a Baseband Unit, a Radio Element, and/or a Remote Radio Head (RRH). mBS 102 may include any combination of hardware, software embedded in a computer readable medium, and/or encoded logic incorporated in hardware or otherwise stored (e.g., firmware) to implement any number of communication protocols that allow for wired or wireless exchange of information in network 100. mBS 102 may be operable to send and receive control messages, and data traffic to endpoints 104. mBS 102 may use any suitable technologies or protocols, e.g., Common Public Radio Interface (CPRI), to communicate with other mBS 102. In some embodiments of the present disclosure, mBS 102 may coordinate with other mBS 102 to communicate jointly with endpoint 104.

In some embodiments of the present disclosure, mBS 102 may be installed on a mobile wireless transmission tower such as those operated by mobile wireless service providers. For example, mBS 102 may be configured to transmit mobile wireless data that complies with the 3rd Generation Partnership Project (3GPP) protocols. In the example illustrated in FIG. 1, mBS 102 may be configured to transmit and/or receive mobile wireless data that complies with the Long Term Evolution (LTE) standard. In the same or alternative embodiments, mBS 102 may be configured to transmit and/or receive mobile wireless data that complies with other protocols, including later releases of 3GPP or other fourth- (or later) generation protocols such as LTE-Advanced (LTE-A).

mBS 102 may also be coupled to any network or combination of networks capable of transmitting signals, data, and/or messages supporting web pages, e-mail, text, chat, voice over IP (VoIP), instant messaging, and/or any other suitable application in order to provide services and support data transmissions to endpoints 104. For example, mBS 102 may be coupled to one or more local area networks (LANs), wide area networks (WANs), metropolitan area networks (MANs), enabling the connection to global distributed networks such as the Internet, or any other form of wireless or wired networking. As an example, mBS 102 may be coupled to a core infrastructure network 112, which may include server 108, via a LAN 114.

Network 100 may also include one or more small cell base stations (scBS) 118a-d (collectively referred to as scBS 118). scBSs 118 may provide any mobile wireless small cell coverage overlaid within the coverage of mBS 102. scBSs 118 may be small cell evolved Node Bs (seNBs), Home evolved Node-B (HeNB), and/or any other suitable devices. In some embodiments of the present disclosure, scBS 118 may be any electronic device configured to switch and/or aggregate mobile wireless data for communication among other devices. In some embodiments of the present disclosure, scBS 118 may include one or more memory and one or more processors configured to execute instructions stored on the memory.

scBS 118 may provide wireless coverage for any suitable number of endpoints 104 over a geographic area such as overlaid small cell (OSC) 116a-d (collectively referred to as OSCs 116). OSC 116 may be a small cell associated with scBS 118 that may be located wholly or partially within the coverage area of a particular mBS 102, e.g., cell 110. In some embodiments of the present disclosure, OSC 116 may also overlap with multiple neighboring cells 110. OSC 116 may have any suitable coverage shape, such as a circular shape as depicted in FIG. 1. OSC 116 may have any suitable size. For example, OSC 116 may have coverage radius 124 of approximately half of a kilometer. Although OSCs 116a-d may be shown in FIG. 1 as having approximately the same size, each OSC 116 may be of any suitable size. OSCs 116a-d may be installed for indoor or outdoor applications. In some embodiments of the present disclosure, it may be necessary or desirable for a home (residential applications) or business (enterprise applications) to have one or more OSC 116 deployed throughout the home or business. In such a manner, a mobile wireless provider may optimize the coverage of the mobile wireless network indoors or to poor coverage areas, which might be more difficult and/or expensive to reach via conventional mobile wireless coverage techniques.

In some embodiments of the present disclosure, scBS 118 may communicate with the mobile wireless provider's core network and/or mBS 102 over a link 132 that may be a wireline link such as digital subscriber line (DSL), optical fiber, or other appropriate wireline link, or an appropriate wireless link. In some embodiments of the present disclosure, this may be beneficial to both the user and the wireless service provider. In some embodiments of the present disclosure, OSC 116 may be a co-channel OSC that operates within mBS 102 broadband spectrum by reusing the same frequency as mBS 102.

Although reference is made above and below with reference to FIGS. 2-9 to LTE as the exemplified mobile wireless technology, other technologies, standards, and/or protocols may be implemented without departing from the scope of the present disclosure. For example, the systems and methods described herein may also be applied to worldwide interoperability for microwave access (WiMAX) as another orthogonal frequency-division multiplexing (OFDM) wireless technology or other suitable wireless technology.

When OSC 116 is active, the user, the user equipment, the radio access network, or some combination thereof may be able to offload some portion of the mobile wireless data traffic onto the local area network for communication back to the core network. This may have the benefit of lowering the traffic level on mBS 102, increasing the number of endpoints 104 that may be served and thereby increasing the overall traffic within mBS 102 coverage, as well as improving performance for the user. In some configurations of scBS 118, this "data offload" process may be performed by a number of different approaches.

Endpoints 104 may be any electronic device configured to receive and/or transmit wireless data, messages, and/or signals to and from other endpoints 104, mBS 102, and/or scBS 118. For example, endpoint 104 may be a mobile wireless telephone, tablet computer, laptop computer, desktop computer, PDA, mobile wireless modem, VoIP phone, wireless measurement device, wireless sensor, wireless sensor embedded in a machine, and/or other device configured to communicate with mBS 102 and/or scBS 118. Endpoints 104 may provide data or network services to a human and/or machine user through any suitable combination of hardware, software embedded in a computer readable medium, real-time processing system, and/or encoded logic incorporated in hardware or otherwise stored (e.g., firmware). Endpoints 104 may also include unattended or automated systems, gateways, other intermediate components or other devices that may send or receive data, messages, and/or signals. Various types of information may be sent to or from endpoints 104. As an example, endpoint 104 may send identification data and status data to mBS 102 and/or scBS 118.

In some embodiments of the present disclosure, machine to machine (M2M) communications, also known as Machine Type Communications (MTC), may utilize endpoints 104 in the form of machine user equipment (M-UE). M2M networks may have traffic patterns significantly different from human mobile traffic. For example, sensor networks in industrial applications, smart grid/meters in residential utility applications, and/or smart home networks may include large numbers of machine UEs. As another example, in some large industrial applications, network 100 may be required to accommodate large numbers of machine UEs, e.g., up to more than approximately 30,000 devices per cell 110. Network 100 may include only machine UEs in the case of a M2M network, or network 100 may be a mix of human mobile devices, such as mobile wireless telephones, and machine UEs in a human/machine network. Endpoints 104 in the form of machine UEs may have the characteristics of being fixed or portable such that some machine UEs may have no mobility attributes. Further, machine UEs may exhibit infrequent, bursty communication, and/or massive surges of peak data traffic patterns.

As described in more detail below with reference to FIGS. 2-9, mBS 102 and/or scBS 118 may be configured to execute instructions performing the allocation routines discussed below. In other configurations, responsibilities for various portions may be distributed among the components of network 100.

In some embodiments of the present disclosure, a concentrator 130 may be utilized that may be in communication with mBS 102, server 108, scBS 118, and/or any other suitable equipment. Concentrator 130 may include a processor, memory, ports, and/or any other suitable components. Concentrator 130 may be configured to gather messages from all endpoints 104 within cell 110 or one or more OSC 116. Concentrator 130 may also be configured to re-assemble any concatenated messages from endpoints 104 (as discussed with reference to FIG. 6 below). Concentrator 130 may further be configured to address the messages received from endpoints 104, e.g., add headers, to forward the messages onto mBS 102, server 108, scBS 118, and/or any other suitable destination. Further, concentrator 130 may be embedded in or co-located with mBS 102.

Although FIG. 1 illustrates example network 100 as having one mBS 102, multiple endpoints 104, and four scBSs 118, it should be understood that these examples are provided to aid in understanding and any number of any given component may be present in a given configuration without departing from the scope of the present disclosure. It should also be understood that the number of any given component may change over time. For example, the number and identity of endpoints 104 present within range of a given scBS 118 may change over time as users move in and out of scBS 118 coverage.

Further, although FIG. 1 illustrates only one iteration of the system comprising mBS 102, endpoints 104, and scBSs 118, a number of such iterations may be present within network 100 without departing from the scope of the present disclosure. For example, there may be a plurality of OSCs 116 present within range of a given cell 110. In other embodiments, network 100 may not include mBS 102.

Figure 2:
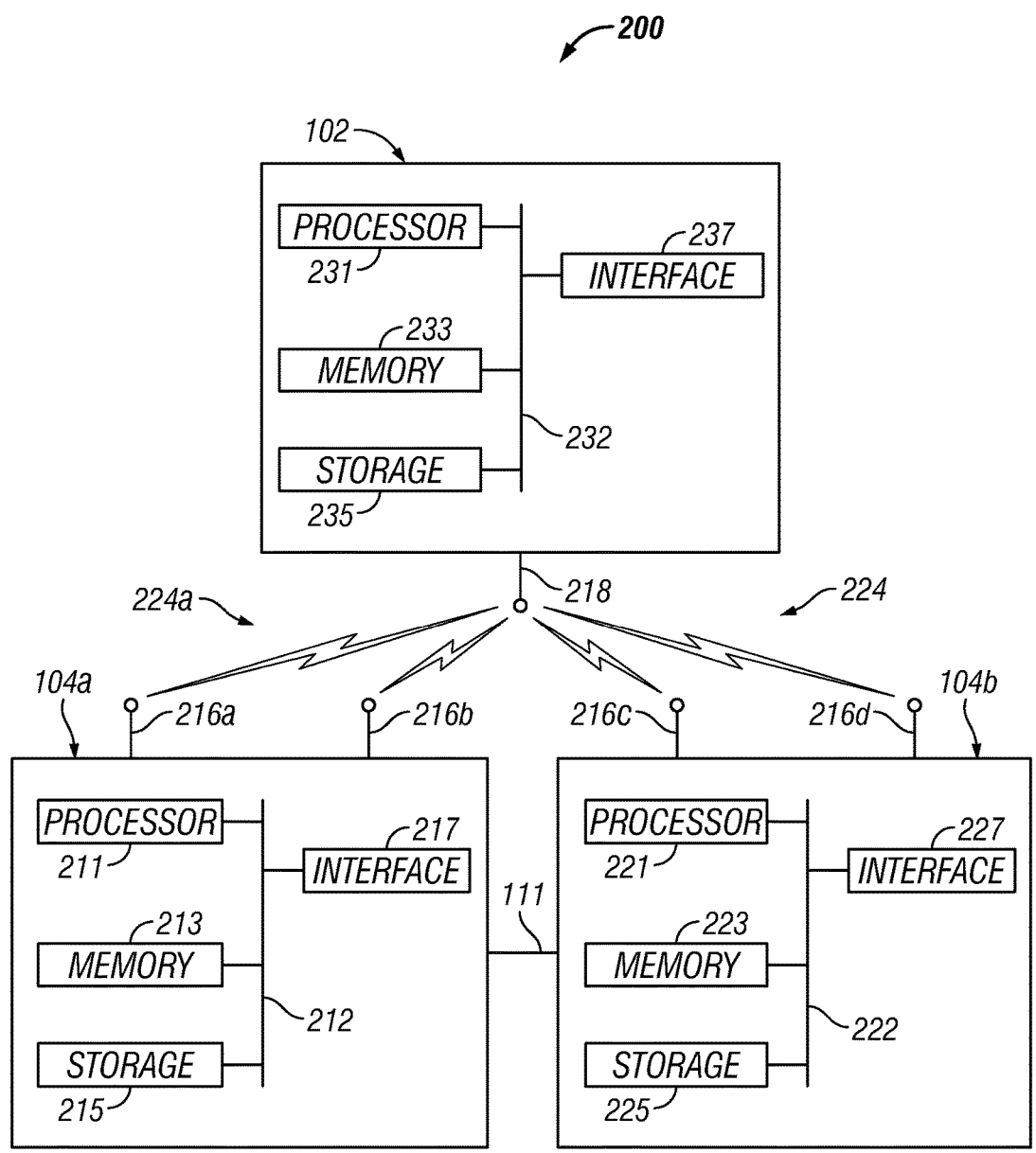
FIG. 2 illustrates example apparatuses that may facilitate the operations of various components of FIG. 1, in accordance with one embodiment of the present disclosure.

FIG. 2 illustrates example apparatuses that may facilitate the operations of various components of FIG. 1, in accordance with one embodiment of the present disclosure. FIG. 2 includes an example communications system 200 with two example endpoints 104 and example mBS 102. Although illustrated utilizing mBS 102, alternatively system 200 may include scBS 118 having the same illustrated components as mBS 102. Communications system 200 may correspond to at least a portion of network 100 of FIG. 1. Endpoints 104 and mBS 102 may each include one or more portions of one or more computer systems.

System 200 may allow for multiple-input/multiple output (MIMO) transmission where multiple antennas are used for transmitting and receiving wireless signals and/or messages. Additionally, system 200 may be configured to perform Coordinated Multi-point Processing (CoMP) to coordinate and combine the transmission of signals and/or messages used in MIMO transmission. The CoMP processing may perform DL CoMP transmission in which multiple mBS 102 jointly communicate with endpoints 104 and/or multiple endpoints 104 communicate with mBS 102.

Endpoints 104 may communicate with mBS 102 using wireless communication via air interface using one or more antenna ports 216. For example, endpoint 104a may communicate with mBS 102 via air interface using antenna ports 216a and 216b. Endpoint 104b may communicate with mBS 102 via air interface using antenna ports 216c and 216d. Endpoints 104 may communicate with mBS 102 using any of a variety of different wireless technologies, including, but not limited to, LTE, and LTE-A protocol as defined in the 3GPP Release 11 or beyond. In some embodiments of the present disclosure, endpoints 104 may coordinate with one more other endpoints 104 to communicate jointly with mBS 102. In such embodiments, endpoints 104 may coordinate with each other to communicate with mBS 102 using a MIMO transmission/reception scheme where multiple transmitting antenna ports 216 may equip different endpoints 104, while one or more transmitting/receiving antenna ports 218 are located at the mBS 102. For example, endpoints 104 may communicate with mBS 102 using a DL CoMP MIMO transmission/reception as defined in 3GPP standards. During such a MIMO transmission, endpoint 104 may wirelessly communicate using multiple layered data streams to mBS 102 via one or more wireless connections between antenna ports 216 and one or more antenna port 218 of mBS 102.

The components of endpoints 104 and mBS 102 may comprise any suitable physical form, configuration, number, type and/or layout. As an example, and not by way of limitation, endpoint 104 and/or mBS 102 may comprise an embedded real-time processing system, computer system, a system-on-chip (SOC), a single-board computer system (SBC) (for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, endpoint 104 and/or mBS 102 may include one or more computer systems or be embedded in a multiple processor system; be unitary or distributed; span multiple locations; span multiple machines; or reside in a cloud, which may include one or more cloud components in one or more networks.

In the depicted embodiment, endpoints 104a and 104b and mBS 102 each include their own respective processor system 211, 221, and 231; memory systems 213, 223, and 233; storage 215, 225, and 235; interface 217, 227, and 237; and bus 212, 222, and 232. Although a particular wireless communications system is depicted having a particular number of particular components in a particular arrangement, this disclosure contemplates any suitable wireless communications system 200 having any suitable number of any suitable components in any suitable arrangement. For simplicity, similar components of endpoints 104a, 104b and mBS 102 will be discussed together. However, it is not necessary for these devices to have the same components, or the same type of components, or be configured in the same manner. For example, processor system 211 may be implemented as an application specific integrated circuit (ASIC) or System-on-Chip (SoC).

Processor systems 211, 221 and 231 may include one or more microprocessors, controllers, or any other suitable computing device, hardware or software resource, or combination of hardware, software and/or encoded logic based on a real-time operating system (RTOS) operable to provide, either alone or in conjunction with other components (e.g., memory systems 213, 223, and 233, respectively), wireless networking functionality. Such functionality may include supporting various wireless features discussed herein. For example, processor system 231 may be configured to analyze and/or process data, messages, and/or signals communicated between mBS 102 and endpoints 104 via channels 224. Further, processor systems 211 and 221 of endpoints 104a and 104b may be configured to analyze signals, messages, and/or data communicated from mBS 102 via channels 224.

In some embodiments of the present disclosure, processor systems 211, 221, and 231 may include hardware for executing instructions, such as those making up a computer program and/or real-time instructions supported by a RTOS. As an example, and not by way of limitation, to execute instructions, processor systems 211, 221, and 231 may retrieve (or fetch) instructions from an internal register, an internal cache, memory systems 213, 223, or 233, respectively, or storage 215, 225 or 235, respectively; decode and execute them; and then write one or more results to an internal register, an internal cache, memory systems 213, 223, or 233, respectively, or storage 215, 225, or 235, respectively.

In some embodiments of the present disclosure, processor systems 211, 221, and 231 may include one or more internal caches for data, instructions, or addresses. This disclosure contemplates processor systems 211, 221, and 231 including any suitable number of any suitable internal caches, where appropriate. As an example, and not by way of limitation, processor systems 211, 221, and 231 may include one or more instruction caches, one or more data caches, and one or more translation lookaside buffers (TLBs) and/or multiple layered buffers. Instructions in the instruction caches may be copies of instructions in memory systems 213, 223, or 233, respectively, or storage 215, 225, or 235, respectively, and the instruction caches may speed up retrieval of those instructions by processor systems 211, 221, or 231, respectively. Data in the data caches may be copies of data in memory systems 213, 223, or 233, respectively, or storage 215, 225, or 235, respectively, for instructions executing at processor systems 211, 221, or 231, respectively, to operate on; the results of previous instructions executed at processor systems 211, 221, or 231 for access by subsequent instructions executing at processor systems 211, 221, or 231, or for writing to memory systems 213, 223, or 233, respectively, or storage 215, 225, or 235, respectively; or other suitable data. The data caches may speed up read or write operations by processor systems 211, 221, or 231. The multiple layered buffers may speed up virtual-address translations for processor systems 211, 221, or 231. In some embodiments of the present disclosure, processor systems 211, 221, and 231 may include one or more internal registers for data, instructions, or addresses. Depending on the embodiment, processor systems 211, 221, and 231 may include any suitable number of any suitable internal registers, where appropriate. Where appropriate, processor systems 211, 221, and 231 may include one or more arithmetic logic units (ALUs); be a multi-core processor; include one or more processor systems 211; or any other suitable processor.

Memory systems 213, 223, or 233 may be any form of volatile and/or non-volatile memory including, without limitation, magnetic media, optical media, random access memory (RAM), read-only memory (ROM), flash memory, removable media, or any other suitable local or remote memory component or components. In some embodiments of the present disclosure, memory systems 213, 223, or 233 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory systems 213, 223, or 233 may include one or more memories 213, 223, or 233, respectively, where appropriate. Memory systems 213, 223, or 233 may store any suitable data or information utilized by endpoints 104a, 104b, or mBS 102, respectively, including software embedded in a computer readable medium, and/or encoded logic incorporated in hardware or otherwise stored (e.g., firmware). In some embodiments of the present disclosure, memory systems 213, 223, or 233 may include main memory for storing instructions for processor systems 211, 221, or 231, respectively, to execute or data for processor systems 211, 221, or 231 to operate on. In some embodiments of the present disclosure, one or more memory management units (MMUs) may reside between processor systems 211, 221, or 231 and memory systems 213, 223, or 233, respectively, and facilitate accesses to memory systems 213, 223, or 233 requested by processor systems 211, 221, or 231, respectively.

As an example, and not by way of limitation, endpoints 104a, 104b, or mBS 102 may load instructions and/or addresses from storage 215, 225, or 235, respectively, or another source (such as, for example, another computer system, another base station, or a remote transmission site) to memory systems 213, 223, or 233, respectively. Processor systems 211, 221, or 231 may then load the instructions from memory systems 213, 223, or 233, respectively, to an internal register or internal cache. To execute the instructions, processor systems 211, 221, or 231 may retrieve the instructions from the internal register or internal cache and decode them. During or after execution of the instructions, processor systems 211, 221, or 231 may write one or more results (which may be intermediate or final results) to the internal register or internal cache. Processor systems 211, 221, or 231 may then write one or more of those results to memory systems 213, 223, or 233, respectively. In some embodiments of the present disclosure, processor systems 211, 221, or 231 may execute only instructions in one or more internal registers and/or internal caches or in memory systems 213, 223, or 233, respectively (as opposed to storage 215, 225, or 235, respectively, or elsewhere), and may operate only on data in one or more internal registers or internal caches or in memory systems 213, 223, or 233, respectively (as opposed to storage 215, 225, or 235, respectively, or elsewhere).

In some embodiments of the present disclosure, storage 215, 225, or 235 may include mass storage for data, instructions, and/or addresses. As an example, and not by way of limitation, storage 215, 225, or 235 may include a hard disk drive (HDD), a floppy disk drive, flash memory, an optical disc, a magneto-optical disc, magnetic tape, or a Universal Serial Bus (USB) drive or a combination of two or more of these. Storage 215, 225, or 235 may include removable or non-removable (or fixed) media, where appropriate. In some embodiments of the present disclosure, storage 215, 225, or 235 may be non-volatile, solid-state memory. In some embodiments of the present disclosure, storage 215, 225, or 235 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215, 225, or 235 may take any suitable physical form and may comprise any suitable number or type of storage. Storage 215, 225, or 235 may include one or more storage control units facilitating communication between processor systems 211, 221, or 231, respectively, and storage 215, 225, or 235, respectively, where appropriate.

In some embodiments of the present disclosure, interfaces 217, 227, or 237 may include hardware, encoded software, or both providing one or more interfaces for communication (such as, for example, packet-based communication) between endpoints 104, mBS 102, any networks, any network devices, and/or any other computer systems. As an example, and not by way of limitation, communication interface 217, 227, or 237 may include a network interface controller (NIC) or network adapter for communicating with an Ethernet or other wire-based network and/or a wireless NIC (WNIC) or wireless adapter for communicating with a wireless network.

In some embodiments of the present disclosure, interfaces 217 or 227 comprise one or more radios blocks (or radio transceivers) coupled to one or more antenna ports 216. In such an embodiment, interface 217 or 227 may receive digital data that is to be processed and sent out to wireless devices, such as mBS 102, via a wireless connection. The radio transceivers may convert the digital data into a radio signal having the appropriate center frequency, bandwidth, transmission power, and/or other suitable air interface parameters. Similarly, the radio transceivers may convert radio signals received via one or more receiving antennas into digital signals to be processed by, for example, processor systems 211 or 221, respectively. Interface 237 of mBS 102 may be configured to perform similar operations via processor system 231 and antenna port 218.

Depending on the embodiment, interface 217, 227, or 237 may be any type of interface suitable for any type of network for which communications system 200 is used. As an example, and not by way of limitation, communications system 200 may be coupled to a supporting core network, an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communications system 200 may communicate with a wireless PAN (WPAN) (such as, for example, a BLUETOOTH WPAN), a WI-FI network, a WI-MAX network, an LTE network, an LTE-A network, a mobile wireless telephone and/or data network (for example, a Global System for Mobile Communications (GSM) network), or any other suitable wireless network or a combination of two or more of these. Endpoints 104a, 104b, and mBS 102 may include any suitable interface 217, 227, or 237, respectively, for any one or more of these networks, where appropriate.

In some embodiments of the present disclosure, interface 217, 227, or 237 may include one or more interfaces for one or more I/O devices. One or more of these I/O devices may enable communication between a person and endpoints 104 and/or mBS 102. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. Some embodiments may include any suitable type and/or number of I/O devices and any suitable type and/or number of interface 217, 227, or 237 for them. Where appropriate, interface 217, 227, or 237 may include one or more drivers enabling processor systems 211, 221, or 231, respectively, to drive one or more of these I/O devices. Interface 217, 227, or 237 may be coupled to radio transceivers, where appropriate.

Bus 212, 222, or 232 may be single or multiple threaded and may include any suitable combination of hardware, software embedded in a computer readable medium, and/or encoded logic incorporated in hardware or otherwise stored (e.g., firmware) to couple components of endpoint 104 and mBS 102 to each other. As an example, and not by way of limitation, bus 212, 222, or 232 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 212, 222, or 232 may include any number, type, and/or configuration of bus 212, 222, or 232, where appropriate. In some embodiments of the present disclosure, one or more buses 212, 222, or 232 (which may each include an address bus and a data bus) may couple processor systems 211, 221, or 231, respectively, to memory systems 213, 223, or 233, respectively. Bus 212, 222, or 232 may include one or more memory buses, and may be specialized and dedicated multi-threaded busses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Some embodiments may include one or more computer-readable storage media implementing any suitable storage. In some embodiments of the present disclosure, a computer-readable storage medium implements one or more portions of processor systems 211, 221, or 231 (such as, for example, one or more internal registers or caches), one or more portions of memory systems 213, 223, or 233, one or more portions of storage 215, 225, or 235, or a combination of these, where appropriate. In some embodiments of the present disclosure, a computer-readable storage medium implements RAM or ROM. In some embodiments of the present disclosure, a computer-readable storage medium implements volatile or persistent memory. In some embodiments of the present disclosure, one or more computer-readable storage media embody encoded software.

Herein, reference to encoded software may encompass one or more applications, bytecode, one or more computer programs, one or more executables, one or more instructions, logic, machine code, one or more scripts, one or more RTOS routines, or source code, and vice versa, where appropriate, that have been stored or encoded in a computer-readable storage medium. In some embodiments of the present disclosure, encoded software includes one or more application programming interfaces (APIs) stored or encoded in a computer-readable storage medium. Some embodiments may use any suitable encoded software written or otherwise expressed in any suitable programming language or combination of programming languages stored or encoded in any suitable type or number of computer-readable storage media. In some embodiments of the present disclosure, encoded software may be expressed as source code or object code. In some embodiments of the present disclosure, encoded software is expressed in a RTOS programming higher-level programming language, such as, for example, C, Perl, or a suitable extension thereof. In some embodiments of the present disclosure, encoded software is expressed in a lower-level programming language, such as assembly language (or machine code). In some embodiments of the present disclosure, encoded software is expressed in JAVA. In some embodiments of the present disclosure, encoded software is expressed in Hyper Text Markup Language (HTML), Extensible Markup Language (XML), real time OS (RTOS), or other suitable markup language.

Accordingly, the above-mentioned components of endpoints 104 and mBS 102 may enable endpoints 104 and mBS 102 to perform operations such as joint data link transmission according to the present disclosure. Modifications, additions, or omissions may be made to FIG. 2 without departing from the scope of the present disclosure. For example, any of the options or features described herein may be utilized in combination with the illustrated embodiments of FIGS. 1 and 2 and/or any number of the other options or features also described herein as would be understood by one of ordinary skill in the art. As another example, mBS 102 may include one or more real time physical (PHY) layer processors and which may be further supported by one or more PHY/media access control (MAC) co-processors (also called "PHY/MAC processor system") coupled to one or more fast access RAM and one or more permanent ROM memory. The real time PHY processor may be configured to process a plurality of messages stored into one or more subframes received from one or more endpoints 104.

Figure 3:
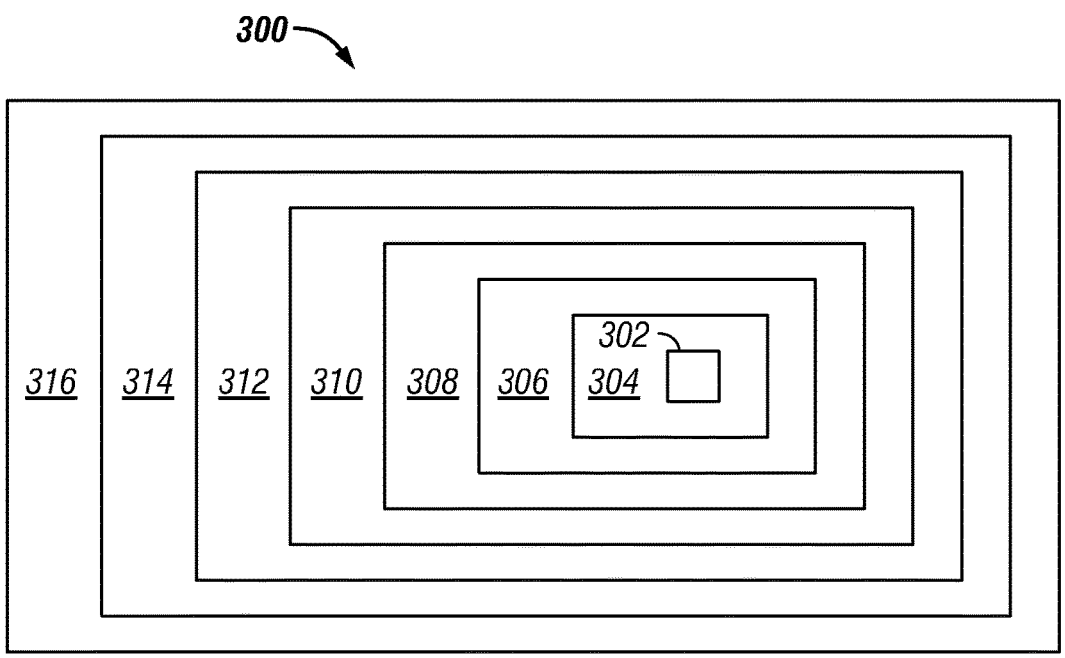
FIG. 3 illustrates an example small packet transmission, in accordance with one embodiment of the present disclosure.

FIG. 3 illustrates an example small packet transmission 300, in accordance with one embodiment of the present disclosure. Transmission 300 may be a communication between endpoint 104 and mBS 102 and/or scBS 118. Transmission 300 may include payload 302 and multiple layers and/or sub-layers of information and/or headers. Payload 302 may reside on an application layer. Payload 302 may include the actual higher layer application data or information that may need to be communicated from endpoint 104 to mBS 102 and/or scBS 118. Transmission 300 may include PHY layer 316 (Layer 1 (L1)) and Ethernet 802.3 (ETH) sub-layer 314 as part of Layer 2 (L2). Transmission 300 may include media access control (MAC) sub-layer 312 and radio link control (RLC) sub-layer 310, and packet data convergence protocol (PDCP) sub-layer 308. MAC sub-layer 312, RLC sub-layer 310, and PDCP sub-layer 308 may correspond to Layer 2 or L2. Further, transmission 300 may include internet protocol (IP) layer 306 or Layer 3 (L3). Transmission 300 may include transmission control protocol (TCP) layer 304 as the transport layer protocol or Layer 4 (L4).

In example embodiments of the present disclosure, endpoint 104 may attempt to communicate payload 302 that includes approximately one bit of data to mBS 102 and/or scBS 118. In order to communicate via an Internet connection (e.g., to an IEEE 802.3 based LAN), the approximately one bit payload 302 may require multiple additional headers associated with multiple sub-layers/layers. For example, transmitting payload 302 may require ETH layer 314, MAC sub-layer 312, RLC sub-layer 310, PDCP sub-layer 308, IP layer 306, and TCP layer 304. However, for a small payload 302, such as approximately one bit, the addition of overhead multiple layers and sub-layers may cause degradation of transmission efficiency. For example, an endpoint 104 may transmit to a LTE up link (UL) resource block PHY frame a payload of approximately one bit. A one bit payload may correspond to an application layer data rate of approximately 0.001 kilobits/second. Assuming an overall thirty-six kilobit UL resource block PHY frame allocated to the user payload, the L1-L4 layer data rate may add approximately 0.552 kilobits/second as overhead. In this case, the resulting overall L1-L4 transmission efficiency may be approximately 0.2%. As another example, transmitting a LTE UL resource block PHY frame payload of approximately five bits may require an application layer data rate of approximately 0.005 kilobits/second. The corresponding L1-L4 layer data rate may add approximately 0.552 kilobits/second as overhead resulting in a transmission efficiency of approximately 1%. An additional example, a relatively larger approximately thirty-six kilobit transmission from endpoint 104 may have a application layer data rate of approximately thirty-six kilobits/second while L1-L4 layer data rate may add approximately 0.552 kilobits/second as overhead resulting in a transmission efficiency of approximately 98.05%. A larger transmission rate may originate from a human mobile device, such as a smart phone, or a complex machine UE (e.g., High definition surveillance cameras). Thus, larger transmissions from endpoints 104 may be efficient with regards to wireless UL efficiency relative to transmissions of small amounts of data. Small amounts of data, or payload 302, may originate as infrequent pings, short pre-scheduled machine user data reports, or other communications from endpoints 104, such as sensors or other suitable equipment. Further, L1-L4 layer overhead for relatively small payload 302 transmissions may degrade the overall efficiency of the wireless network. Thus, network 100 may experience transmission efficiency reduction when small packet transmissions are employed. In mixed machine and human traffic applications, where infrequent small packet transmission from some endpoints 104 may require support, network 100 may have poor UL efficiency.

In some embodiments of the present disclosure, a network access request (e.g., message and/or user packet request) transmitted by endpoints 104 may be sent using a Random Access Channel (RACH) backed by a Physical Random Access Channel (PRACH). A PRACH may be a shared channel used for initial network access between endpoint 104 and mBS 102 and/or scBS 118. A PRACH may also be utilized for communication of unscheduled access related messages such as when endpoint 104 exits sleep mode, loses power, attempts to connect to the network, or executes a handover. Thus, for example, the PRACH may be the physical support for transmitting a last gasp message (LGM), mass scale event triggered (MSET) device identification, and/or other message from endpoints 104 to mBS 102 and/or scBS 118 across and/or utilizing an LTE, LTE-A network, or other wireless network. A LGM may be a message sent from endpoint 104 just prior to endpoint 104 losing power, e.g., during a mass power outage. During M2M mass event scenarios, (e.g., after a power outage scenario) impacting most or all endpoints 104 connected to mBS 102 and/or scBS 118, the related network 100, and particularly PRACH, may be overloaded when the mass event resolves, e.g., power is returned. Additionally, network 100 may be unable to identify particular endpoints 104 that are involved in the mass event. When large numbers of endpoints 104 attempt to access the network approximately simultaneously, the access channel, for example a RACH/PRACH, may be overloaded. If the PRACH becomes overloaded, then messages and/or signals sent from endpoints 104 attempting to connect and/or reconnect to mBS 102 and/or scBS 118 may collide and some or most endpoints 104 may be unable to connect to network 100.

The RACH may be a specific L2 control channel using PHY (L1) PRACH signals to transmit network related access messages, e.g., RACH messages. Further, the PRACH may be based on a particular implementation of the Zadoff-Chu (ZC) function. A ZC function may exhibit excellent auto-correlation, cross-correlation and constant amplitude zero autocorrelation (CAZAC) properties. A ZC function may have a set number of total roots, NZC. For example, in an LTE implementation, the ZC function may have eight hundred and thirty-nine roots or NZC=839. The particular root number for a PRACH signature may be designated as "n." In operation, for example, if a particular endpoint 104 transmits over a PRACH with a root five hundred and eleven, e.g., n=511, then a decoder on mBS 102 and/or scBS 118 may detect only noise during scanning until it reaches root five hundred and eleven where mBS 102 and/or scBS 118 may detect a voltage spike, or "needle" like signal, that may indicate a message and/or signal from that particular endpoint 104. Further, a time cyclical shift of a ZC root may exhibit similar auto-correlation properties as the main ZC root with no time shift applied. A ZC function related time shift may be designated as NCS.

In some embodiments of the present disclosure, mBS 102 and/or scBS 118 may have L2 radio link, packet convergence, and/or other specific capabilities that may support user-over-control plane message processing to and/or from endpoints 104. For example, user data from endpoints 104 may be transmitted over an access control plane channel, e.g., a RACH associated with a PRACH. Endpoint 104 user information payload transmitted over an access control plane channel, also part of a control plane in an LTE configuration, may be designated as "user-over-control plane" messages. In some embodiments of the present disclosure, a PRACH may be used as a PHY layer control channel and may be employed in user-over-control plane messaging, e.g., PRACH U/C messages. Further, PRACH U/C messages may be termed "U/C messages," and subframes designated for PRACH U/C messaging may be termed "U/C messaging subframes." In some embodiments of the present disclosure, U/C messages may be transmissions that do not include the L1-L4 overhead (e.g., L1-L4 headers or layers) that may be required for standard user data payloads. Thus, U/C messages may be efficient with respect to standard RACH messages when employed for small payloads 302.

Figure 4:
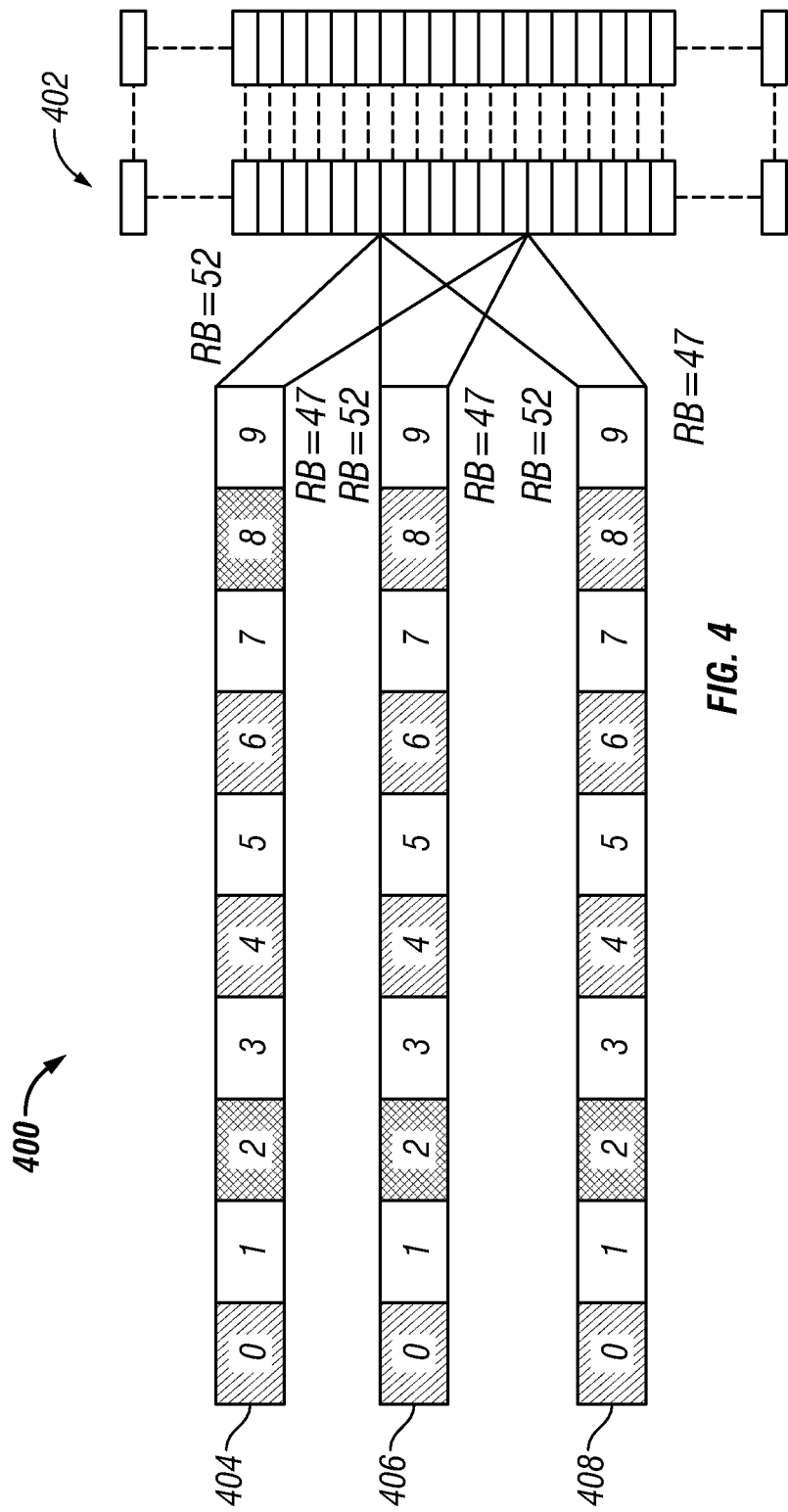
FIG. 4 illustrates an example allocation in a plurality of resource blocks associated with multiple macro base stations (mBSs) configured such that each mBS covers an associated cell that is adjacent or located in the same vicinity to the cells of the other mBSs, in accordance with one embodiment of the present disclosure.

FIG. 4 illustrates an example allocation 400 in a plurality of resource blocks 402 associated with multiple mBSs 102 configured such that each mBS covers an associated cell that is adjacent or located in the same vicinity to the cells of the other mBSs, in accordance with one embodiment of the present disclosure. Resource blocks 402 of bandwidth may be used for a frequency band shared by one or multiple mBS 102 operating in a mobile wireless network. Example allocation 400 may be understood to represent multiple resource blocks in frequency. For example, a LTE channel bandwidth of twenty MHz may include approximately one hundred resource blocks 402. In the example allocation 400, the middle resource blocks may be designated for PRACH access, or designated as the PRACH resource blocks. For example, in a set of one hundred resource blocks, resource blocks forty-seven through fifty-two may be designated for PRACH access, e.g., RB=47-52. A resource block may represent a ten millisecond duration and may be referred to as a "frame." Each resource block may be further divided into subframes that may correspond to a time duration.

Subframes used for network access may also be referred to as "random access subframes." For example, resource block 404 may have ten subframes numbered zero through nine, each subframe corresponding to one millisecond of time. Each subframe may correspond to a set of user data or control communication requests (e.g., a request or transmission of a packet of data or other information) between endpoints 104 and mBS 102. Additionally, in digital communications, such as communication over a wireless network, e.g., network 100 of FIG. 1, an access signature may be a sequence of known bits included in each transmission to synchronize endpoints 104 in time and frequency with mBS 102. Endpoint 104 may utilize random access subframes employing ZC signatures when transmitting to mBS 102. The access sequence may be known and made available to the endpoint, which may select randomly one of the signatures to transmit to the base station.

Further, some embodiments may include up to sixty-four PRACH signatures per random access subframe. In some embodiments of the present disclosure, as endpoints 104 communicate with mBS 102, sixty-four signatures may be processed by mBS 102 within one random access subframe. A random access subframe may be used for network access or for U/C messaging, in some embodiments of the present disclosure. Further, a signature of a ZC function may be a specific time shift (NCS) for a given ZC root (NZC). For a small cell (e.g., OSC 116 having a radius of less than approximately 0.79 kilometers), one ZC root may have up to sixty-four signatures, which may be uniquely related to signature logical indexes, assigned a PHY time cyclical shift (NCS) value as represented in the table below:

TABLE 1

| PHY $N_{CS}$ Value | Signature Logical Index |
|---|---|
| 0 | 00 |
| 13 | 01 |
| 26 | 02 |
| 39 | 03 |
| 52 | 04 |
| 65 | 05 |
| 78 | 06 |
| 91 | 07 |
| 104 | 08 |
| 117 | 09 |
| 130 | 0A |
| 143 | 0B |
| 156 | 0C |
| 169 | 0D |
| 182 | 0E |
| 195 | 0F |
| 208 | 10 |
| 221 | 11 |
| 234 | 12 |
| 247 | 13 |
| 260 | 14 |
| 273 | 15 |
| 286 | 16 |
| 299 | 17 |
| 312 | 18 |
| 325 | 19 |
| 338 | 1A |
| 351 | 1B |
| 364 | 1C |
| 377 | 1D |
| 390 | 1E |
| 403 | 1F |
| 416 | 20 |
| 429 | 21 |
| 442 | 22 |
| 455 | 23 |

TABLE 1-continued

| PHY $N_{CS}$ Value | Signature Logical Index |
|---|---|
| 468 | 24 |
| 481 | 25 |
| 494 | 26 |
| 507 | 27 |
| 520 | 28 |
| 533 | 29 |
| 546 | 2A |
| 559 | 2B |
| 572 | 2C |
| 585 | 2D |
| 598 | 2E |
| 611 | 2F |
| 624 | 30 |
| 637 | 31 |
| 650 | 32 |
| 663 | 33 |
| 676 | 34 |
| 689 | 35 |
| 702 | 36 |
| 715 | 37 |
| 728 | 38 |
| 741 | 39 |
| 754 | 3A |
| 767 | 3B |
| 780 | 3C |
| 793 | 3D |
| 806 | 3E |
| 819 | 3F |

In some embodiments of the present disclosure, certain subframes on the PRACH resource blocks may be designated for particular types of access. As an example, in allocation 400, resource block 404 for a particular mBS may designate subframes two and eight for U/C messaging; subframes zero, four, and six for standard PRACH access, e.g., by a RACH message; and the remaining subframes for standard data transmission. As another example, resource blocks 406 and 408 for additional mBSs, may designate subframe two for U/C messaging; subframes zero, four, six, and eight for standard PRACH access, e.g., by a RACH message; and the remaining subframes for standard data transmission. Subframes for a particular type of access may be assigned statically, semi-statically, or dynamically. Dynamic assignment may allow the subframes allocated to U/C messaging to change rapidly over time depending on message requests, and semi-static allocations may allow a slower change over time to the subframes allocated for U/C messaging. The amount of U/C message demands may be monitored by mBS 102, scBS 118, and/or any other suitable equipment via a U/C collision rate. As the U/C collision rate increases, more subframes may be designated for U/C messaging in order to meet the U/C messaging demand. All PRACH resource blocks may be time aligned for all mBSs 102 that may have cells 110 associated with a wireless carrier operator within a certain time accuracy. All PRACH resource blocks may be time aligned for all mBSs 102 that may have overlapping or neighboring cells 110. In this case, the ZC root used for U/C messaging may be different from the ZC root used for RACH messaging. Thus, in some embodiments of the present disclosure, U/C messaging subframes may utilize a different ZC root than those employed by PRACH access subframes.

In some embodiments of the present disclosure, endpoint 104 may be in IDLE mode the majority of the time. Endpoint 104 may transition from IDLE mode to transmit via PRACH when requesting to synchronize with network 100 as a result of a transmission request, hand over, and/or wake-up from IDLE mode. However, in some embodiments of the present disclosure, endpoint 104 may be enabled to transmit a message via U/C messaging directly from IDLE mode and may not be required to transition from IDLE mode. Thus, UL messaging from endpoint 104 may be possible directly from IDLE mode and may preserve air interface (or wireless) resources.

In some embodiments of the present disclosure, U/C messaging may have multiple messaging/access modes of operation. One messaging/access mode may be triggered by the network, e.g., by mBS 102 and/or scBS 118. The messaging/access mode of a specific endpoint 104 may be scheduled by mBS 102 and/or scBS 118 at certain times and therefore may be "collision free." In collision free mode, each endpoint 104 may have a scheduled unique time slot to report data.

An additional messaging/access mode may be triggered by endpoint 104. In some embodiments of the present disclosure, the endpoint 104 triggered messaging/access mode may occur following a mass scale triggered event (MSTE). After a MSTE, multiple endpoints 104 may attempt to access and report to the network utilizing U/C messaging.

Figure 5:
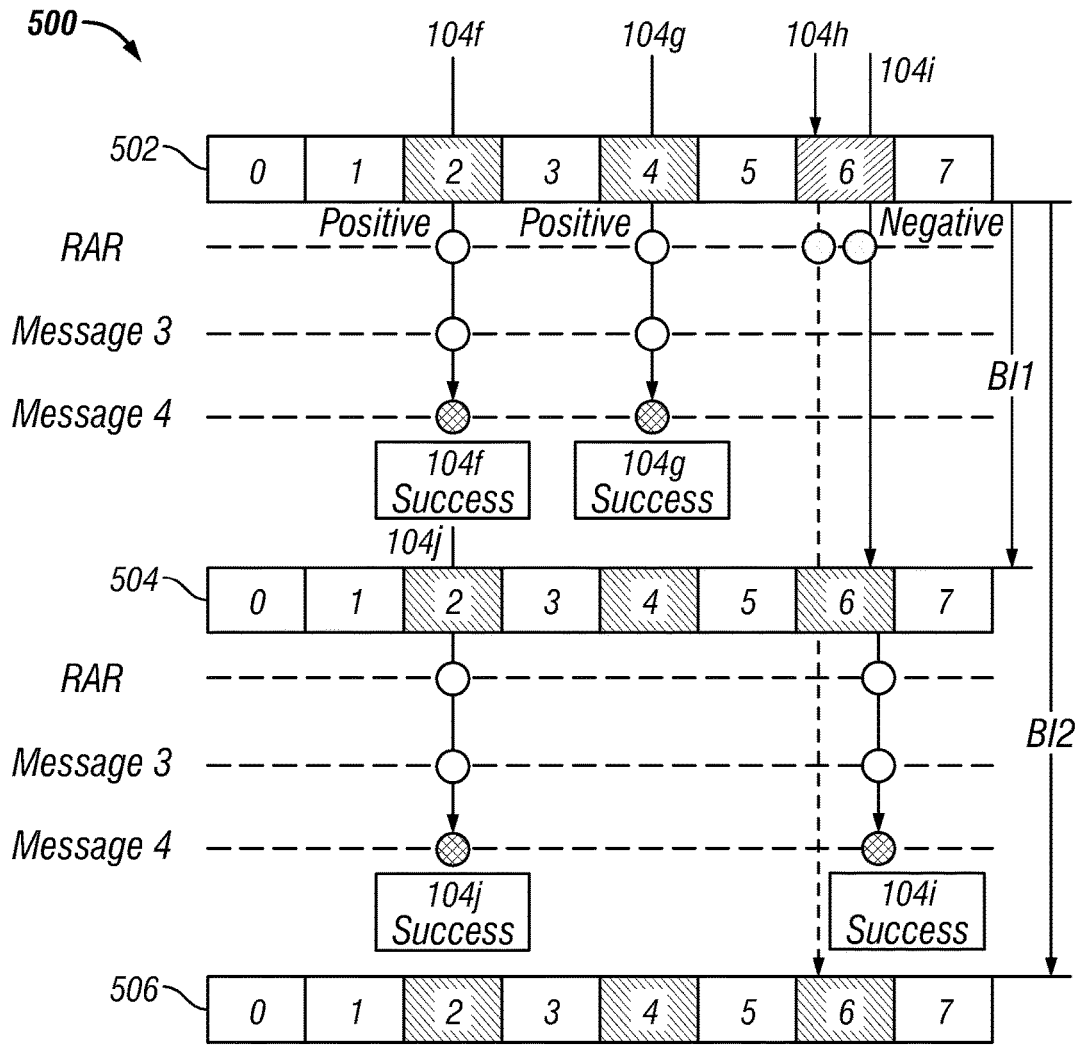
FIG. 5 illustrates an example user-over-control plane (U/C) messaging procedure between endpoints and mBS and/or small cell base station (scBS), in accordance with one embodiment of the present disclosure.

FIG. 5 illustrates an example U/C messaging procedure 500 between endpoints 104 and mBS 102 and/or scBS 118, in accordance with one embodiment of the present disclosure. Procedure 500 may correspond to a random access (RA) procedure. Procedure 500 may be employed when endpoints 104 may attempt to reconnect to network 100 or to transmit a "high priority" message (as discussed in detail below) to network 100 after a MSTE or other occurrence in which endpoints 104 may have disconnected from network 100. Resource blocks 502, 504, and 506 may all be associated with mBS 102. Further, resource blocks 502, 504, and 506 may be sequential frames and may be separated by a preset amount of time. Resource blocks 502, 504, and 506 may include subframes designated for U/C messaging, such as subframes two, four, and six.

In the example, procedure 500 may begin with a transmission from endpoints 104*f*-104*i* to mBS 102 that may include random access signatures. Although illustrated utilizing mBS 102, alternatively or in addition procedure 500 may include scBS 118. Endpoint 104*f* may attempt to connect to mBS 102 utilizing U/C messaging subframe two. As an example, endpoint 104*g* may attempt to connect to mBS 102 utilizing U/C messaging subframe four. Endpoints 104*h* and 104*i* may attempt to connect to mBS 102 utilizing U/C messaging subframe six.

As an example, mBS 102 may respond to endpoints 104 with a Random Access Response (RAR). If the transmission is properly received and processed by mBS 102, mBS 102 may transmit a positive RAR (or acknowledgement). For example, endpoints 104*f* and 104*g* may receive a positive RAR indicating a successful transmission. Further, Message 3 may be transmitted by endpoints 104*f* and 104*g* and mBS 102 may respond with Message 4 indicating successful connection. A successful procedure 500 may be termed a RA procedure.

In some embodiments of the present disclosure, for example, if mBS 102 does not properly decode a transmission from endpoint 104 due to signature collision, mBS 102 may transmit a negative RAR. The negative RAR may include a back-off indicator (BI). A negative RAR may indicate to endpoint 104 to wait and resend the message later. The BI may include a parameter indicating the random time delay before endpoint 104 may send an additional transmission. Thus, after a preselected or scheduled passage of time, e.g., the BI time, endpoint 104 may re-attempt to transmit. For example, endpoints 104*h* and 104*i* may both attempt to transmit using U/C messaging subframe six. mBS 102 may return a negative RAR. The negative RAR sent to endpoint 104*i* may include BI1. The negative RAR transmitted to endpoint 104*h* may include BI2. Thus, after a passage of time equal to BI1, endpoint 104*i* may reattempt to connect. During the same frame, endpoint 104*j* may attempt connection on U/C messaging subframe two. After a passage of time equal to BI2, endpoint 104*h* may reattempt to connect. Thus, procedure 500 may contain four messaging steps between endpoint 104 and mBS 102.

Additionally U/C messaging may have multiple logical modes. For example, one logical mode may be designated for pre-defined "high priority" messages. The high priority mode may designate logical indexes with a pre-defined description. For example, there may be sixty-four logical indexes, e.g., signatures, in any message. These logical indexes may be assigned descriptions such as state reading messages, alarm messages, abnormal supply voltage messages, LGM, CPU alarm message, tampering attempt message, and/or any other suitable message. In a device triggered mode following a MSTE, high priority alarm codes, e.g., LGM, may be scheduled multiple times with the same U/C messaging subframe in order to provide an increased opportunity for transmission of high priority messages. Another logical mode may be designated as a "concatenated" mode. In concatenated mode, in some embodiments of the present disclosure, a particular endpoint 104*a* may be able to transmit a concatenated message. A concatenated message may be a message that includes two character strings joined end-to-end. Thus, a concatenated message may occur when endpoint 104*a* overrides a sequence of two U/C messages in order to transmit a twelve bit sequence in place of a six bit sequence. In some embodiments of the present disclosure, a particular endpoint 104 may be able to override, as an example, a sequence of three U/C messages in order to transmit an eighteen bit sequence.

FIG. 6 illustrates a high priority concatenated U/C message transmitted by a particular endpoint 104*a* accessing resource block 600, in accordance with one embodiment of the present disclosure. Resource block 600 may have designated subframes two and six for U/C messaging. Endpoint 104*m* may attempt to access subframe two of frame k. Approximately simultaneously endpoint 104*u* and endpoint 104*s*, located in cell 110, may also attempt to access subframe two of frame k and override the same signature. If endpoint 104*m* is able to transmit in frame k the logical index 0F, then in concatenated mode, endpoint 104*m* may also be configured to attempt access in subframe two of frame k+1 and transmit the logical index 1A. As a consequence, if a concatenated mode is employed, endpoint 104*m* may have transmitted in frames k and k+1 and the messages may be assembled. Further, endpoint 104*m* may be configured to access a different subframe designated for U/C messaging, such as subframe six in frame k or k+1. A concentrator, such as concentrator 130 shown in FIG. 1, may be configured to assemble concatenated messages. In some embodiments of the present disclosure, other possible architectural arrangements, such as a new L2 sub-layer in M2M networks, may be employed to facilitate assembly of concatenated messages. Assuming successful U/C messaging of endpoint 104*m* in frames k and k+1, such a machine traffic concentrator may retrieve the twelve bit concatenated sequence 03DA (hex)

Figure 7B:
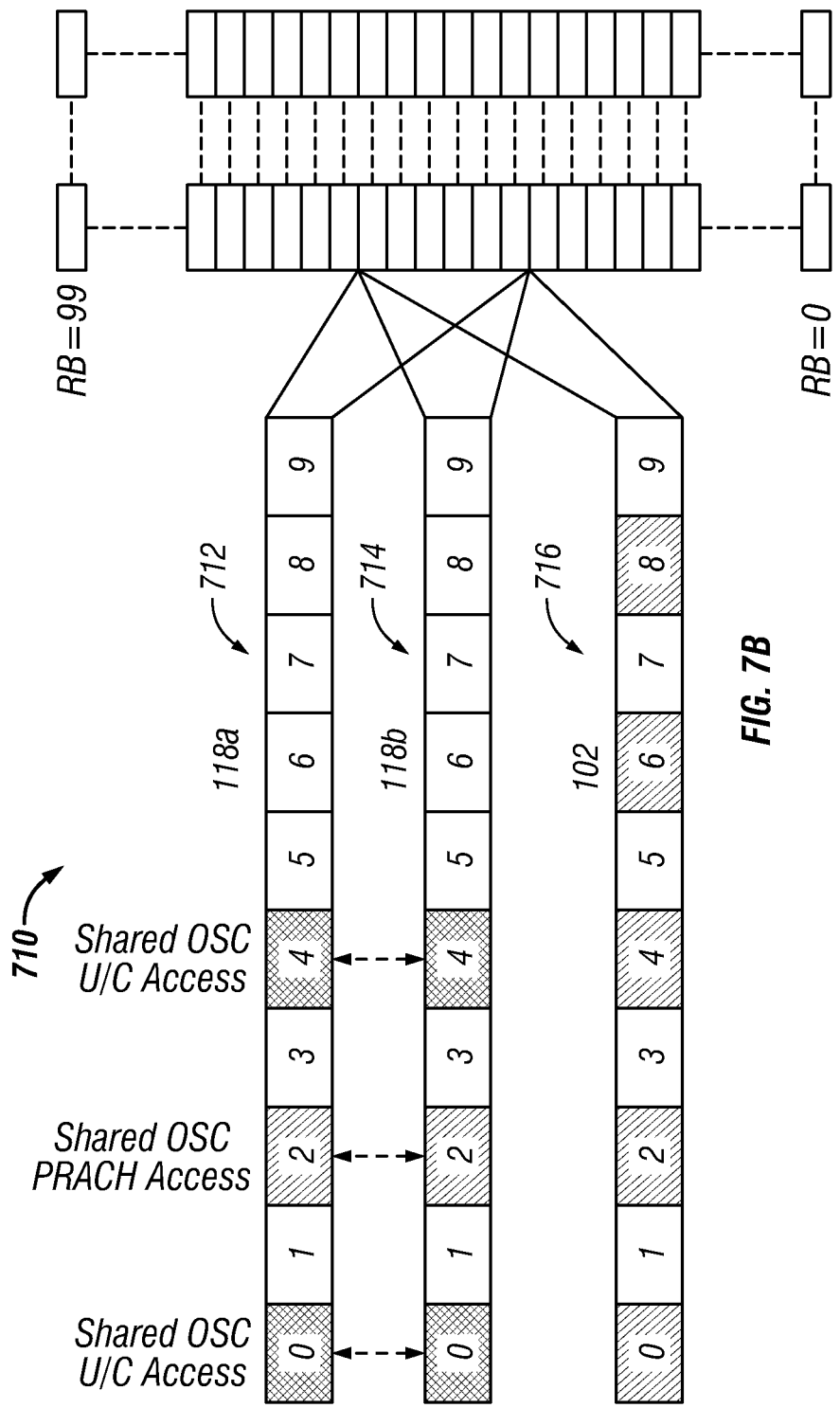
FIG. 7B illustrates an example allocation utilized in an intra-cell OSC U/C messaging and physical random access channel (PRACH) access sharing configuration among two or more OSC for the network shown in FIG. 1, in one embodiment of the present disclosure.
Figure 7A:
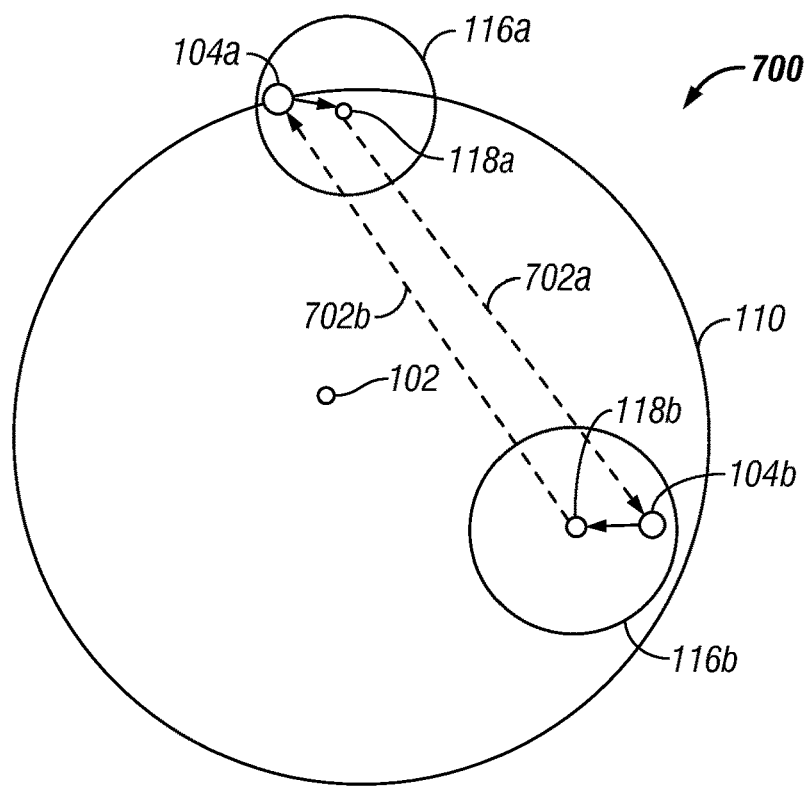
FIG. 7A illustrates an example network configured for path isolation between the two illustrated OSCs, in accordance with one embodiment of the present disclosure.

FIG. 7A illustrates an example network 700 configured for path isolation between the two illustrated OSC, in accordance with one embodiment of the present disclosure. In operation of the present example, when endpoint 104a transmits over the PRACH to scBS 118a, the transmission may also reach scBS 118b via interference path 702a. When endpoint 104b transmits over the PRACH to scBS 118b, the transmission may also reach scBS 118a via interference path 702b. Interference path 702a and 702b may be commonly referred to as interference paths 702. Interference paths 702 may be termed the "PRACH interference path," when the interference occurs between PRACH sequences employed by both scBS 118a and 118b For example, interference may occur when both endpoints 104a and 104b may transmit the same PRACH signature over the same frequency channel in the same time aligned random access subframe. In order to reduce or eliminate this PRACH interference (e.g., transmitted in OSC 116a), the interfering signal (e.g., operating the same frequency channel and using the same time-aligned random access subframe as endpoint 104b) received and processed at the interference target (e.g., OSC 116b and scBS 118b operating), should trigger a smaller PRACH correlator voltage output compared to the PRACH signal received and processed from endpoint 104b. For example, to reduce or eliminate interference at scBS 118b from endpoint 104a, the signal from endpoint 104a received at scBS 118b may cause a much smaller PRACH correlator voltage output than the signal from endpoint 104b received at scBS 118b. Use of the same signature sets and the associated PRACH interference at scBS 118a and 118b may cause PRACH collisions, when the two scBSs are not separated by the distance of the PRACH immunity radius. Collisions may result in subsequent PRACH access and U/C messaging latencies or barring.

In some embodiments of the present disclosure, and for simplicity, network 700 may be assumed to be configured such that each endpoint 104 may be "path isolated" with respect to other endpoints 104. For example, such an assumption may allow endpoints 104a to transmit U/C messages to scBS 118a utilize the same signatures, e.g. same ZC root, $N_{CS}$, and random access subframe assignation, as employed by OSC 116b associated with scBS 118b for PRACH access. As a further example, scBS 118b may have designated random access codes of the same ZC root, with logical indexes, such as 1000xxx for PRACH access and 1001xxx for U/C messaging. Assuming path isolation as explained above, scBS 118a may employ the same ZC root by re-using the same random access codes with logical indexes, such as PRACH access 1001xxx and U/C messaging 1000xxx. Further, mBS 102 may provide the overlaying coverage for OSC 116a and 116b and may employ the PRACH signature set 0xxxxxx that contains sixty-four signatures. Additionally, such a configuration also may allow endpoint 116b to transmit U/C messages to scBS 118b utilizing the same ZC signatures, e.g., same ZC root, $N_{CS}$, and random access subframe assignation, as employed by OSC 116a associated with scBS 118a for PRACH access.

FIG. 7B illustrates an example allocation 710 utilized in a intra-cell OSC 116 U/C messaging and PRACH access sharing configuration among two or more OSC for network 100 shown in FIG. 1, in one embodiment of the present disclosure. In the present example, one or more sets of OSC 116 random access signatures may be shared by another intra-cell OSCs for executing high priority U/C messaging, across same random access time aligned subframes and PRACH access across the same random access subframes. For example, resource block 712 may be associated with a UL transmission to scBS 118a and may correspond to resource blocks forty-seven through fifty-two. Resource block 714 may be associated with a UL transmission to scBS 118b. Resource block 714 may correspond to resource blocks forty-seven through fifty-two during the same time frame as resource block 712. Resource block 716 may be associated with a UL transmission to mBS 102. Resource block 716 may correspond to resource blocks forty-seven through fifty-two during the same time frame as resource blocks 712 and 714. Thus, resource blocks 712, 714 and 716 may be time aligned with UL transmissions executed to scBS 118a and 118b. Further, subframes zero and four may be designated as U/C messaging. Subframe two may be designated as standard PRACH access, e.g., for a RACH message.

In some embodiments of the present disclosure, intra-cell OSCs, e.g., OSC 116a and 116b, may be configured to share the same signature sets. For example, the set of time shifted signatures of the same ZC root may be assigned as subsets to a group of neighboring scBSs 118, under the condition that no signature may be re-used among this set of signatures. As example, with reference to FIG. 1, endpoint 104a transmitting to scBS 118a within OSC 116a coverage may use the signature set 00 . . . 0F of $N_{ZC}$=0 for access and signature set 00 . . . 0F of NZC=1 for U/C messaging. As an example, subframe zero and four may be used for U/C messaging and subframe two for random access (PRACH access). Endpoint 104b transmitting to scBS 118b within OSC 116b coverage may use the signature set 10 . . . 1F of $N_{ZC}$=0 for access and signature set 10 . . . 1F of NZC=1 for U/C messaging, during the same time aligned subframe. Thus, by assigning the same signature sets (belonging to one or more ZC roots) among two or more OSCs, the same ZC root may be shared by endpoints 104 associated with different scBSs 118 or mBS 102. Since RACH and U/C messaging may require different signature sets, e.g., one ZC root for PRACH access for a RACH message and one ZC root for U/C messaging, at least two ZC roots may be necessary.

In some embodiments of the present disclosure, a ZC root, e.g., a signature set based on a particular $N_{ZC}$ root, may be designated for PRACH random access and shared by OSCs 116 located in the coverage area of mBS 102. Such a ZC root may be referred to as {PRACH$_{OSCaccess}$}. {PRACH$_{OSCaccess}$} may provide sixty-four signatures per random access subframe. An additional ZC root may provide an additional sixty-four signature set and may be designated for U/C messaging by OSCs 116 located in the coverage area of mBS 102. This additional ZC root may be referred to as {PRACH$_{OSC\_U/C}$}. {PRACH$_{OSC\_U/C}$} may provide sixty-four signatures per random access subframe. {PRACH$_{OSCaccess}$} and {PRACH$_{OSC\_U/C}$} may be shared among all OSCs 116 for PRACH access and U/C messaging, respectively. A logical pool of signatures, referred to as {PRACH$_{OSC}$}, may be created by appending the PRACH access and U/C messaging signature sets for a given OSC, as expressed by the following relationship:

$$\{PRACH_{OSC}\}=\{PRACH_{OSCaccess}\} \cup \{PRACH_{OSC\_U/C}\}.$$

Assuming the radius of each OSC 116 is less than approximately 0.79 kilometers and there are many fewer OSCs 116 endpoints 104 than mBS 102 endpoints 104 (e.g., OSC(endpoints)<<mBS(endpoints)), there may be sixty-four ZC root time shifts ($N_{CS}$) employed for OSCs 116 located within the coverage of mBS 102. Additionally, as an example, there may be four scBSs 118, e.g., scBSs 118a, 118b, 118c, and 118d, associated with four OSCs 116, e.g., OSCs 116a, 116b, 116c, and 116d. By allocating two ZC roots, e.g., $N_{ZC}=0$ for PRACH access and $N_{ZC}=1$ for U/C messaging, for the present example of four scBSs 118, the following ZC root and related time shifts logical indexes could be shared separately for access and U/C messaging:

TABLE 2

|  | $PRACH_{OSCaccess}$ ($N_{ZC} = 0$) | $PRACH_{OSC\_U/C}$ ($N_{ZC} = 1$) | $N_{CS}$ Logical Index |
|---|---|---|---|
| scBS 118a | 00 . . . 0F | 00 . . . 0F | 0 . . . 15 |
| scBS 118b | 10 . . . 1F | 10 . . . 1F | 16 . . . 31 |
| scBS 118c | 20 . . . 2F | 20 . . . 2F | 32 . . . 47 |
| scBS 118d | 30 . . . 3F | 30 . . . 3F | 48 . . . 63 |

As illustrated in the current example, the sixty-four PRACH access signatures and sixty-four U/C messaging signatures per different random access subframes may be divided evenly among the four scBS 118a, 118b, 118c, and 118d. Other embodiments of the present disclosure may employ non-symmetrical distribution of PRACH access signatures and U/C messaging signatures based in part on the amount of endpoints 104 associated with OSCs 116a, 116b, 116c, and 116d during a certain period of time.

Although illustrated with reuse of only two signature sets, more or fewer sets may be reused. For example, with ten subframes in each PRACH resource block, up to nine may be designated as PRACH U/C messaging with one remaining for PRACH access based on endpoint 104 connected user related access demands. Such a configuration may be utilized in an arrangement with multiple OSCs 116 in an interior or underground location such that access to the outside is limited.

Figure 7C:
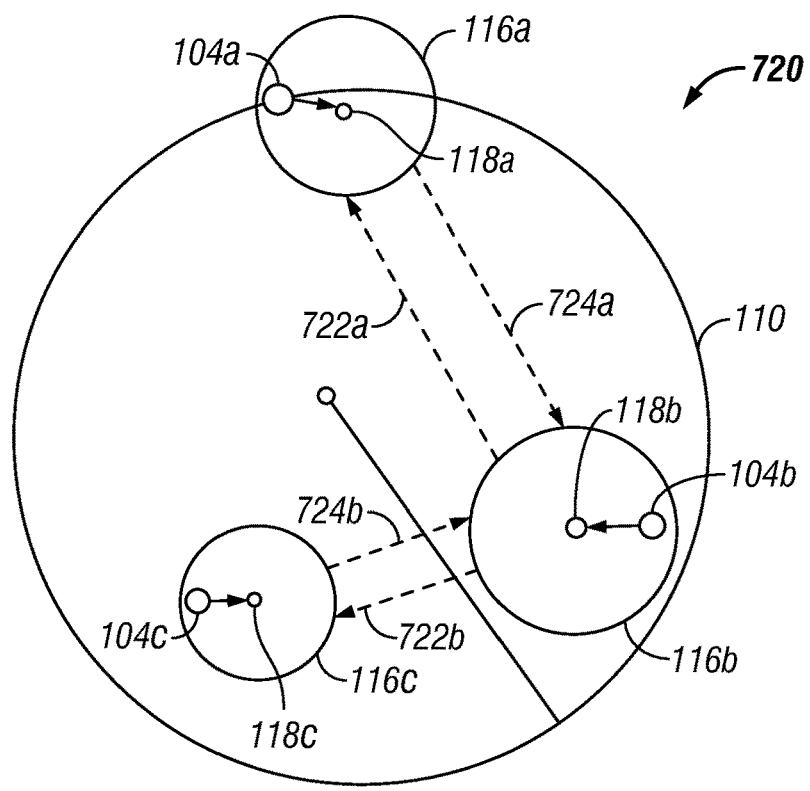
FIG. 7C illustrates an example network having a semi-static U/C messaging scheduling configuration, in accordance with one embodiment of the present disclosure.

FIG. 7C illustrates an example network 720 having a semi-static U/C messaging scheduling configuration, in accordance with one embodiment of the present disclosure. In such a configuration, correlation may be made between complementary residential and business traffic patterns for allocating the same signature sets during different time periods provided complementary traffic patterns are employed. For example, scBS 118b associated with OSC 116b may be configured within or proximate an enterprise and may be utilized primarily or exclusively by endpoints 104 providing wireless communication services for a business. Additionally, scBSs 118a and 118c associated with OSC 116a and 116c, respectively, may be configured within or proximate homes and may be utilized primarily or exclusively by endpoints 104 associated with a home. Many businesses may experience the majority of their network activity during the workday while many residential networks may experience the majority of their network activity in the evenings and on weekends. Allocation of signature sets may be scheduled such that the signature sets maybe allocated between residential and business networks on a semi-static basis to accommodate traffic peaks within each OSC 116. For example, during the workday, signature sets may be re-assigned from OSC 116a and 116c to OSC 116b as shown by directional arrows 724a and 724b, respectively, and returned to the original assignation during the nights and weekends. In the evenings and/or on weekends, signature sets may be re-assigned from OSC 116b to OSC 116a and 116c as shown by directional arrows 722a and 722b, respectively, and returned to the original assignation during the weekdays.

Figure 8:
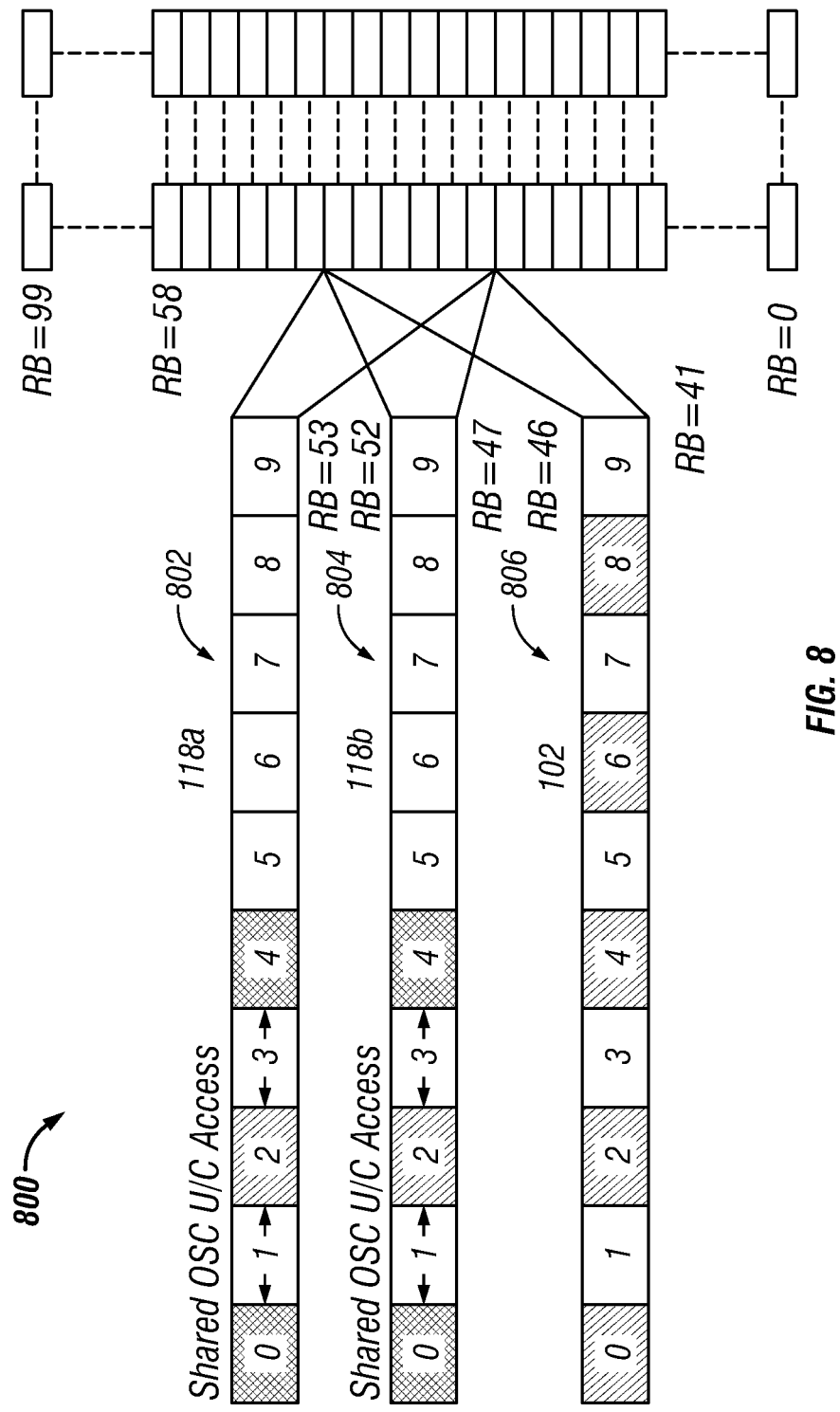
FIG. 8 illustrates an example allocation utilized in an intra-macro-cell U/C messaging and PRACH access resources within the same OSC configuration for the network shown in FIG. 1, in accordance with one embodiment of the present disclosure.

FIG. 8 illustrates an example allocation 800 utilized in an intra-macro-cell U/C messaging and PRACH access resources within same OSC 116 configuration for network 100 shown in FIG. 1, in accordance with one embodiment of the present disclosure. Allocation 800 may illustrate scBS 118a sharing a different signature set for PRACH access and U/C messaging, and scBS 118b also sharing a signature set for PRACH access and U/C messaging. The pool of random access signatures for each scBS 118 may be split between PRACH access and U/C messaging. The allocation of random access signatures and random access subframes may be static, semi-static, or dynamic depending on the traffic and user requirements of scBS 118 subframes and the signature sets. In the present example, random access subframes zero and four may be designated to supporting U/C messaging on resource blocks 802 and 804. Subframe two may be designated for standard PRACH access on resource blocks 802 and 804. Resource blocks 802 and 804 may be associated with scBS 118a and 118b, respectively, and both may utilize different signature sets across subframes zero, two, and four. Since one or more ZC signature sets may be dedicated for both PRACH access and U/C messaging (in different random access subframes) for each scBS 118, only one ZC root may be necessary per OSC 116. However, in some embodiments, provided path isolation exists as discussed with reference to FIG. 7A, two or more scBS 118 and associated OSCs 116 may share the same random access signature set.

Additionally, the data throughput that may be processed by a particular scBS 118 may be measured in bits per second (bps). An increase in the maximum data throughput of scBS 118 may correspond to increased availability and/or efficiency of that particular scBS 118 and/or the network. In some embodiments of the present disclosure, the data throughput of the U/C messages may be measured across the PRACH ($PRACH_{U/C}$ throughput).

In some embodiments of the present disclosure, for a particular OSC 116, the same ZC root, e.g., signature set, may be shared for both PRACH access and U/C messaging. The shared signature set may be referred to as $\{PRACH_{OSCi}\}$. $\{PRACH_{OSCi}\}$ may be split between PRACH access and U/C messaging dynamically based on endpoint 104 messaging demand in terms of PRACH access and U/C messaging and/or OSC 116 access resources. Signature sets designated for PRACH access may be referred to as $\{PRACH_{OSCi\_access}\}$. Signatures designated for U/C messaging may be referred to as $\{PRACH_{OSCi\_U/C}\}$. Accordingly, the shared signature set may include both PRACH access signatures and U/C messaging signatures, based on the following logical relationship:

$$\{PRACH_{OSCi}\}=\{PRACH_{OSCi\_access}\}$$
$$U\{PRACH_{OSCi\_U/C}\}.$$

Additionally, as an example, there may be four scBSs 118, e.g., scBS 118a, 118b, 118c, and 118d, associated with four OSCs 116, e.g., OSCs 116a, 116b, 116c, and 116d. By allocating four ZC root ($N_{ZC}=0, 1, 2, 3$ for PRACH access and U/C messaging) for the present example of four scBSs 118, the following signatures and related root indexes may be employed and may achieve the corresponding $PRACH_{U/C}$ throughput:

TABLE 3

|  |  |  | $PRACH_{U/C}$ Throughput [bps] | | ZC Root Index |
|---|---|---|---|---|---|
|  | $PRACH_{OSCi\_access}$ | $PRACH_{OSCi\_U/C}$ | Min | Max | |
| scBS 118a | 00 . . . 0F (16 sig) | 10 . . . 3F (48 sig) | 98 | 883 | 0 |
| scBS 118b | 00 . . . 10 (32 sig) | 11 . . . 3F (32 sig) | 59 | 535 | 1 |
| scBS 118c | 00 . . . 1F (48 sig) | 20 . . . 3F (16 sig) | 23 | 214 | 2 |
| scBS 118d | 00 . . . 07 (8 sig) | 08 . . . 3F (56 sig) | 119 | 1077 | 3 |

Figure 9:
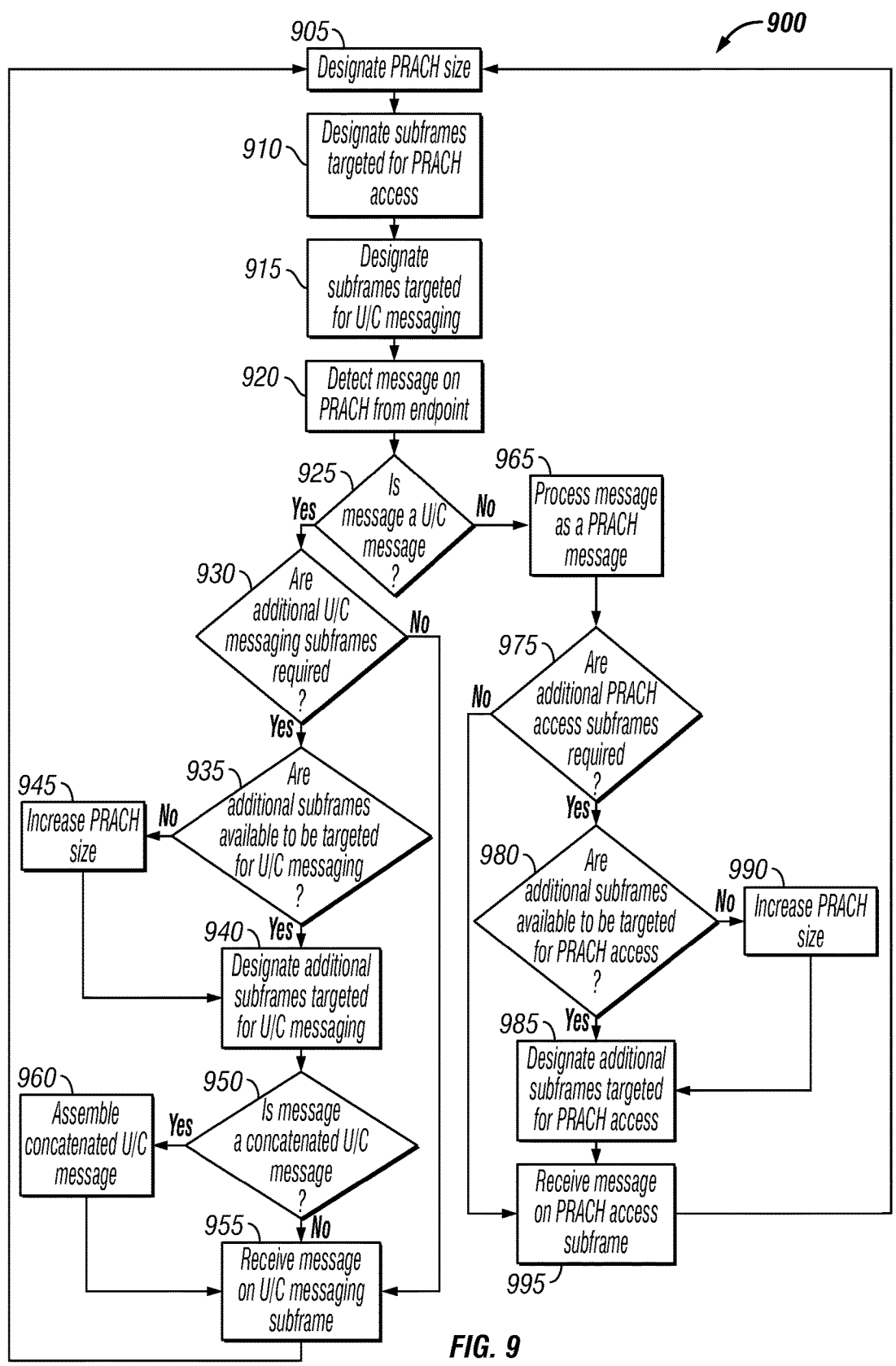
FIG. 9 illustrates a flow chart of an example method for U/C messaging in a wireless network, in accordance with one embodiment of the present disclosure.

FIG. 9 illustrates a flow chart of an example method 900 for U/C messaging in a wireless network, such as network 100 of FIG. 1, in accordance with one embodiment of the present disclosure. The steps of method 900 may be performed by various computer programs, models or any combination thereof, configured to simulate and design systems for U/C messaging. The programs and models may include instructions stored on computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The programs and models may be configured to direct a processor or other suitable unit to retrieve and execute the instructions from the computer-readable media. For illustrative purposes, method 900 is described with respect to network 100 of FIG. 1; however, method 900 may be used for U/C messaging on any suitable network. Further, although discussed with reference to a network, portions or all of method 900 may be executed by a component of network 100 including mBS 102, server 108, scBS 118, concentrator 130 and/or any other suitable component.

Method 900 may start and at step 905, a network may designate a PRACH size. For example, network 100 and/or mBS 102 may designate a PRACH size based in part on the requirements of network 100, such as number and configuration of OSCs 116 and endpoints 104. Designating a PRACH size may include selecting particular resource blocks intended for PRACH use and the time assignment of the related random access subframes. For example, with reference to FIG. 4, mBS 102 may select resource blocks forty-seven through fifty-two for PRACH access. Method 900 may proceed to step 910.

At step 910, the network may designate random access subframes in the selected PRACH resource blocks as targeted for PRACH access subframes. For example, with reference to FIG. 4 subframes zero, four, and six as may be designated as targeted for PRACH access for mBS 102. As another example, with reference to FIG. 7B, subframe two may be designated as targeted for PRACH access, or as PRACH access subframes, for scBSs 118a and 118b.

At step 915, the network may designate subframes in the selected PRACH resource blocks as U/C messaging subframes out of the overall amount of designated random access subframes. For example, with reference to FIG. 4, subframes two and eight may be designated as targeted for U/C messaging, or as U/C messaging subframes, for mBS 102. Further, the network may inform endpoints 104 how the random access signature set may be shared between the U/C messaging subframes and PRACH access subframes, or if U/C messaging subframes and standard PRACH access subframes may have separate signature sets. Method 900 may proceed to step 920.

At step 920, the network may detect a PRACH transmission from an endpoint, such as endpoint 104. For example, mBS 102 and/or scBS 116 may detect a message transmitted over a random access subframe from a particular endpoint 104. At step 925, the network, knowing the expected U/C messaging signature set, may determine if the message is a U/C message. For example, mBS 102 and/or scBS 118 may identify the message (e.g., logical index of the PRACH signature) and endpoint 104 as discussed with reference to Tables 1, 2, and 3. If the message is a U/C message, method 900 may proceed to step 930.

At step 930, the network may determine if additional U/C messaging subframes are required. For example, the number of U/C messaging subframes may not be sufficient if many endpoints 104 may be attempting to access network 100 following a mass scale event, such as a power outage and attempting to transmit large numbers of U/C messages. If additional U/C messaging subframes are not necessary, method 900 may proceed to step 955. If the number of U/C messaging subframes is not sufficient, method 900 may proceed to step 935.

At step 935, the network may determine if there are additional subframes available to be targeted for U/C messaging. If additional subframes are available, method 900 may proceed to step 940 in which additional subframes may be designated for U/C messaging. If additional subframes are not available at step 935, then the PRACH size may be increased at step 945. PRACH size may be increased by designation of additional resource blocks as PRACH resource blocks or any other suitable method. For example, PRACH size may be increased by re-designation of subframes initially designated for data access into U/C subframes. After the increase of PRACH size, method 900 may return to step 940 to designate additional subframes targeted for U/C messaging. Method 900 may proceed to step 950.

At step 950, the network may determine if the U/C message is a concatenated message. If the U/C message is a concatenated message, method 900 may proceed to step 960. At step 960, the U/C message may be assembled. For example, a U/C message may be concatenated as discussed with reference to FIG. 6. A concentrator, such as concentrator 130 shown on FIG. 1, and/or other suitable equipment may be configured to assemble concatenated messages.

If, at step 950, the U/C message is not concatenated or after a concatenated message is assembled at step 960, then the network at step 955, may receive and process the message on a designated U/C messaging subframe. For example, with reference to FIG. 4, mBS 102 may receive the message on U/C messaging subframe 2. Method 900 may return to step 905.

If at step 925, the network determines the message is not a U/C message, method 900 may proceed to step 965. At step 965, the network may process the message as a standard RACH message and attempt to decode or perform other suitable operations. Method 900 may proceed to step 975.

At step 975, the network may determine if additional PRACH access subframes are required. For example, the number of PRACH access subframes may not be sufficient if many endpoints 104 may be attempting to access network 100 following a mass scale event, such as a power outage. If additional PRACH access subframes are not necessary, method 900 may proceed to step 995. If the number of PRACH access subframes is not sufficient, method 900 may proceed to step 980.

At step 980, the network may determine if there are additional subframes available to be targeted for PRACH access. If additional subframes are available, method 900 may proceed to step 985 in which additional subframes may be designated for PRACH access. If additional subframes are not available at step 980, then the PRACH size may be increased at step 990. PRACH size may be increased by designation of additional resource blocks as PRACH resource blocks or any other suitable method. After the increase of PRACH size, method 900 may return to step 985 to designate additional subframes targeted for PRACH access. Method 900 may proceed to step 995.

At step 995, the network may receive the message on a designated PRACH access subframe. For example, with reference to FIG. 4, mBS 102 may receive the message on PRACH access subframe, such as subframe zero or four. Method 900 may then proceed back to step 905.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the invention.

What is claimed is:

1. A method for managing a wireless network traffic comprising:
   designating a first resource block of a first base station for access by a random access channel (RACH);
   designating a first plurality of random access subframes associated with the first resource block for access by a user-over-control plane message;
   receiving a random access signal from a concentrator that collects the random access signal from an endpoint;
   forwarding the random access signal to the first base station over a random access subframe, the random access signal received on the RACH using the wireless network, the random access signal attempting to access one of the first plurality of designated random access subframes; determining if the random access signal is the user-over-control plane message;
   in response to determining the random access signal is the user-over-control plane message, processing the random access signal on the one of the first plurality of designated random access subframes;
   receiving the random access signal from a concentrator that collects the random access signal from an endpoint at a second base station;
   designating a second resource block of the second base station for access by the RACH, the second resource block corresponding to the first resource block of the first base station; and
   designating a second plurality of random access subframes associated with the second resource block for access by the user-over-control plane message, the second plurality of random access subframes corresponding to the first plurality of random access subframes.

2. The method of claim 1, wherein the random access signal is received from the endpoint in idle mode.

3. The method of claim 1, further comprising designating a second plurality of random access subframes associated with the first resource block for access by a RACH message.

4. The method of claim 1, wherein the second resource block corresponding to the first resource block comprises the second resource block time-aligned with the first resource block.

5. The method of claim 4, wherein the first plurality of random access subframes and the second plurality of random access subframes comprise signatures based on a Zadoff-Chu (ZC) root with a plurality of cyclical time shifts.

6. The method of claim 4, wherein the first plurality of random access subframes and the second plurality of random access subframes comprise signatures based on a plurality of ZC roots.

7. The method of claim 1, wherein the random access signal is one of a concatenated message, a last gasp message, and a mass scale triggered event message.

8. The method of claim 1, wherein the first plurality of random access subframes and the second plurality of random access subframes are designated on a semi-static basis.

9. The method of claim 1, wherein the first base station and the second base station are located based in part on an immunity radius.

10. One or more non-transitory computer-readable media embodying logic that, when executed by a processor, is configured to perform operations comprising:
    designating a first resource block of a first base station for access by a random access channel (RACH);
    designating a first plurality of random access subframes associated with the first resource block for access by a user-over-control plane message;
    receiving a random access signal from a concentrator that collects the random access signal from an endpoint;
    forwarding the random access signal to the first base station over a subframe, the random access signal received on the RACH using a wireless network, the random access signal attempting to access one of the first plurality of designated random access subframes;
    determining if the random access signal is the user-over-control plane message;
    in response to determining the random access signal is the user-over-control plane message, processing the random access signal on the one of the first plurality of designated random access subframes;
    receiving the random access signal from a concentrator that collects the random access signal from an endpoint at a second base station;
    designate a second resource block of the second base station for access by the RACH, the second resource block corresponding to the first resource block of the first base station; and
    designate a second plurality of random access subframes associated with the second resource block for access by the user-over-control plane message, the second plurality of random access subframes corresponding to the first plurality of random access subframes.

11. The media of claim 10, wherein the random access signal is received from the endpoint in idle mode.

12. The media of claim 10, further comprising designating a second plurality of random access subframes associated with the first resource block for access by a RACH message.

13. The media of claim 10, wherein the second resource block corresponding to the first resource block comprises the second resource block time-aligned with the first resource block.

14. The media of claim 13, wherein the first plurality of random access subframes and the second plurality of random access subframes comprise signatures based on a Zadoff-Chu (ZC) root with a plurality of cyclical time shifts.

15. The media of claim 13, wherein the first plurality of random access subframes and the second plurality of random access subframes comprise signatures based on a plurality of ZC roots.

16. A base station system for wireless communication comprising:
    a memory;
    a processor coupled to the memory, the processor configured to:
    designate a first resource block of a first base station for access by a random access channel (RACH);
    designate a first plurality of random access subframes associated with the first resource block for access by a user-over-control plane message;

receive a random access signal from a concentrator that collects the random access signal from an endpoint;

forward the random access signal to the first base station over a subframe, the random access signal received on the RACH using a wireless network, the random access signal attempting to access one of the first plurality of designated random access subframes;

determine if the random access signal is the user-over-control plane message; and in response to determining the random access signal is the user-over-control plane message, process the random access message on one of the first plurality of designated random access subframes; and a second processor configured to: the random access signal from a concentrator that collects the random access signal from an endpoint at a second base station;

designate a second resource block of the second base station for access by the RACH, the second resource block corresponding to the first resource block of the first base station; and designate a second plurality of random access subframes associated with the second resource block for access by the user-over-control plane message, the second plurality of random access subframes corresponding to the first plurality of random access subframes.

17. The base station system of claim 16, wherein the random access signal is received from the endpoint in idle mode.

* * * * *